US012750698B2

(12) United States Patent
Rao

(10) Patent No.: US 12,750,698 B2
(45) Date of Patent: Sep. 29, 2026

(54) AUTOMATED CHANGE IN SITE CONFIGURATION DURING A CRISIS

(71) Applicant: RAKUTEN MOBILE, INC., Tokyo (JP)

(72) Inventor: Srikrishna Chennampalli Nagaraja Rao, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 335 days.

(21) Appl. No.: 18/566,663

(22) PCT Filed: Oct. 17, 2023

(86) PCT No.: PCT/US2023/035317
§ 371 (c)(1),
(2) Date: Dec. 4, 2023

(87) PCT Pub. No.: WO2025/085055
PCT Pub. Date: Apr. 24, 2025

(65) Prior Publication Data

US 2025/0126487 A1 Apr. 17, 2025

(51) Int. Cl.
*H04W 24/02* (2009.01)
*H04L 41/0659* (2022.01)
*H04W 24/08* (2009.01)

(52) U.S. Cl.
CPC ......... *H04W 24/02* (2013.01); *H04L 41/0661* (2023.05); *H04W 24/08* (2013.01)

(58) Field of Classification Search
CPC ..... H04W 24/04; H04W 24/02; H04W 24/08; H04W 4/90; H04L 41/0668; H04L 41/0661; H04L 41/0654
See application file for complete search history.

(56) References Cited

U.S. PATENT DOCUMENTS

| | | | | |
|---|---|---|---|---|
| 11,395,223 B2 * | 7/2022 | Crofford | .......... | H04W 52/0206 |
| 12,501,470 B2 * | 12/2025 | Lee | .................. | H04W 72/1273 |
| 2021/0297946 A1 | 9/2021 | Menon | | |
| 2021/0385051 A1 * | 12/2021 | Mehta | .................. | H04W 24/08 |
| 2023/0232253 A1 * | 7/2023 | Apatachioae | ......... | H04W 24/04<br>455/424 |
| 2023/0247489 A1 * | 8/2023 | Mehta | .................. | H04W 24/02<br>455/574 |
| 2024/0205835 A1 * | 6/2024 | Wang | .................... | H04W 52/02 |
| 2024/0224061 A1 * | 7/2024 | Dhaka | .................. | H04W 16/18 |
| 2025/0106759 A1 * | 3/2025 | Mehta | .................. | H04W 72/23 |

* cited by examiner

*Primary Examiner* — Shukri Taha
(74) *Attorney, Agent, or Firm* — HAUPTMAN HAM, LLP

(57) ABSTRACT

A method, device, and non-transitory computer-readable media for automating a change in site configuration during a crisis. Sites in a mobile network are monitored for power outages. A determination is made whether a power outage for a plurality of the sites in the mobile network qualifies as a crisis. In response to the power outage of the plurality of the sites qualifying as a crisis, the plurality of the sites in the mobile network that experience the power outage is converted from a higher configuration to a lower configuration. Whether a cause for the power outage of the plurality of the sites has been addressed is determined. In response to the cause for the power outage of the plurality of the sites being addressed, the plurality of the sites in the mobile network that were converted to the lower configuration are converted to the higher configuration.

20 Claims, 8 Drawing Sheets

AUTOMATED CHANGE IN SITE CONFIGURATION DURING A CRISIS

RELATED APPLICATIONS

The present application is a National Phase of International Application No. PCT/US2023/035317, filed Oct. 17, 2023.

TECHNICAL FIELD

This description relates to a device for automating a change in site configuration during a crisis, and a method of using the same.

BACKGROUND

Base stations typically include, among other things, a radio frequency (RF) unit, a baseband (BB) unit, a power amplifier (PA), and one or more antennas. The RF unit receives digital information and control signals from the baseband unit and modulates this information into a radio frequency ("RF") signal that is amplified by the power amplifier and then transmitted through the antennas. The RF unit also receives RF signals from the antenna and demodulates these signals and supplies them to the baseband unit. The baseband unit processes demodulated signals received from the radio into a format suitable for transmission over a backhaul communications system. The baseband unit also processes signals received from the backhaul communications system and supplies the processed signals to the RF Unit.

A power supply is coupled to a grid supply and generates suitable direct current ("DC") power signals for powering the baseband unit, the RF unit, and other base station components. For example, the RF unit is often powered by a DC power supply, e.g., a 48 volt DC power supply. Communications services play an important role in the delivery of public safety services, and that role is especially prominent during a crisis that leads to power outages. A battery backup is typically provided to maintain service for a limited period of time during power outages.

Maintaining RF site operations, such as a base station, is relied on by radio users in the field. With an RF site, the backup power solution is provided to provide a predetermined number of hours of battery backup at the site. The backup power supply for the base station is an important component of the communication network, plays an important role in guaranteeing the stable and safe operation of the network, and provides continuous power supply of the base station under various conditions.

A wide-area power disruption event is a type of crisis that is caused by events such as a natural disaster (e.g., earthquake, typhoon/hurricane, tornado, or other severe weather event), a political crisis (e.g., terrorist attacks, cyber-attacks, protests, etc.), other external crisis, human error (e.g., accidents during maintenance or upgrades), and the like.

Multiple-Input Multiple-Output (MIMO) is a method for multiplying the capacity of a radio link using multiple transmission and receiving antennas to exploit multipath propagation. A base station is able to be configured using a higher MIMO configuration, such as 4T4R, or a lower MIMO configuration, such as 2T2R. 4T4R uses 4 transmit antennas and 4 receive antennas whereas 2T2R uses 2 transmit antennas and 2 receive antennas.

During a wide-area power disruption event, herein referred to as a crisis, a base station configured in a higher MIMO configuration (e.g., 4T4R) is able to be powered by a battery backup for a predetermined amount of standby time, e.g., 3 hours. The amount of standby time is a function of the backup battery design and other factors including load, defects, and environmental factors such as temperature. However, herein 3 hours of standby time for a higher MIMO configuration (e.g., 4T4R) is used.

In response to receiving notification of an outage or otherwise detecting an outage, a site configuration is manually changed from 4T4R to 2T2R, wherein battery usage reduces by close to 50% which will help in prolonged usage of battery to provide more time for power recovery to happen. Manual conversion from a higher MIMO configuration to a lower MIMO configuration is performed by network personnel under crisis situations under the guidance of an administrator of an administrative district. However, manual intervention is slow to react to crisis situations or other situations resulting in power disruption.

SUMMARY

In at least embodiment, a method includes monitoring sites in a mobile network for power outages. A power outage for a plurality of the sites in the mobile network is determined to qualify as a crisis. The plurality of the sites in the mobile network that are in a higher configuration are converted to a lower configuration. A determination is made whether a cause for the power outage of the plurality of the sites has been addressed. In response to the cause for the power outage of the plurality of the sites being addressed, the plurality of the sites in the mobile network that were converted to the lower configuration are converted to the higher configuration.

In at least one embodiment, a device includes a memory storing computer-readable instructions, and a processor connected to the memory, wherein the processor is configured to execute the computer-readable instructions to perform operations to monitor sites in a mobile network for power outages. A power outage for a plurality of the sites in the mobile network is determined to qualify as a crisis. The plurality of the sites in the mobile network that are in a higher configuration are converted to a lower configuration. A determination is made whether a cause for the power outage of the plurality of the sites has been addressed. In response to the cause for the power outage of the plurality of the sites being addressed, the plurality of the sites in the mobile network that were converted to the lower configuration are converted to the higher configuration.

In at least one embodiment, a non-transitory computer-readable media having computer-readable instructions stored thereon, which when executed by a processor causes the processor to perform operations including monitoring sites in a mobile network for power outages. A power outage for a plurality of the sites in the mobile network is determined to qualify as a crisis. The plurality of the sites in the mobile network that are in a higher configuration are converted to a lower configuration. A determination is made whether a cause for the power outage of the plurality of the sites has been addressed. In response to the cause for the power outage of the plurality of the sites being addressed, the plurality of the sites in the mobile network that were converted to the lower configuration are converted to the higher configuration.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
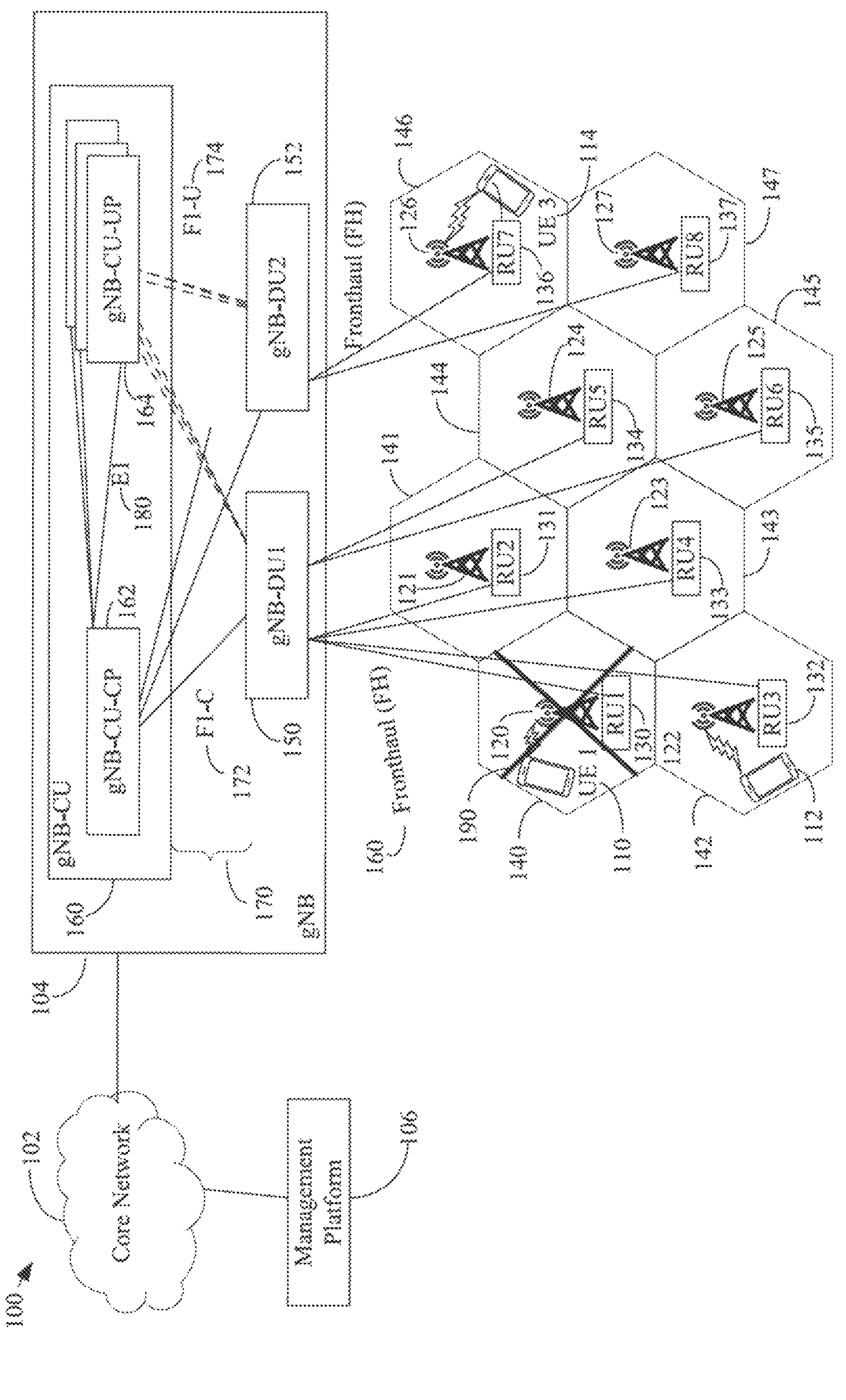
FIG. 1 illustrates Communications Network (RAN) architecture according to at least one embodiment.

Embodiments described herein describe examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

In at least one embodiment, a method for automating a change in site configuration during a crisis includes monitoring sites in a mobile network for power outages, determining a power outage for a plurality of the sites in the mobile network qualifies as a crisis, converting the plurality of the sites in the mobile network that are in a higher configuration to a lower configuration, determining whether a cause for the power outage of the plurality of the sites has been addressed, and in response to the cause for the power outage of the plurality of the sites being addressed, converting the plurality of the sites in the mobile network that were converted to the lower configuration to the higher configuration.

Embodiments described herein provide a method that provides one or more advantages. For example, automating a change in site configuration during a crisis provides a faster solution than manual intervention, which is slow to react to crisis situations or other situations resulting in power disruption.

FIG. 1 illustrates Communications Network (RAN) architecture 100 according to at least one embodiment.

In FIG. 1, Communications Network architecture 100 includes a Core Network 102 and a Radio Access Network 104. UE 1 (User Equipment 1) 110, UE 2 112, UE 3 114 access a mobile network via RAN 100. Radio Access Network 100 includes Radio Towers 120, 121, 122, 123, 124, 125, 126, 127. However, many more Radio Towers are able to be implemented. As shown in FIG. 1, Radio Units (RUs) 130, 131, 132, 133, 134, 135, 136, 137 are associated with Radio Towers 120, 121, 122, 123, 124, 125, 126, 127, respectively. RUs 130, 131, 132, 133, 134, 135, 136, 137 are the radio hardware units that covert radio signals sent to and from the antenna into a digital signal for transmission over packet networks. RUs 130, 131, 132, 133, 134, 135, 136, 137 handle the digital front end (DFE) and the lower PHY layer, as well as the digital beamforming functionality. The RU is located near, or integrated into, antennas (not shown in FIG. 1) at Radio Towers 120, 121, 122, 123, 124, 125, 126, 127.

FIG. 1 shows one of RUs 130, 131, 132, 133, 134, 135, 136, 137 per cell 140, 141, 142, 143, 144, 145, 146, 147. However, cells 140, 141, 142, 143, 144, 145, 146, 147 are able to be divided into sectors, e.g., three sectors. For example, in response to cells 140, 141, 142, 143, 144, 145, 146, 147 being divided into three sectors, where a cell includes 3 RUs, e.g., an RU for a sector. Cell site configurations that include three physical sectors use different frequency bands to serve a sector. RUs 130, 131, 132, 133, 134, 135, 136, 137 are further able to include multiple antenna ports, e.g., 2, 4, 8, 16, etc., to support Multiple-Input And Multiple-Output (MIMO). MIMO is a method for multiplying the capacity of a radio link using multiple transmission and receiving antennas to exploit multipath propagation.

As shown in FIG. 1, gNB-Distributed Units (gNB-DU) 150, 152 are able to support more than one RU, e.g., to serve carriers of the same cells from different RUs, or to process multiple cells with one DU and multiple RUs. For example, gNB-DU 150 is associated with RU1 1 130, RU2 131, RU3 132, RU4, 133, RU5 134, and RU6 135. gNB-DU 152 is associated with RU7 1 136, and RU8 137.

gNB-DU1 150 and gNB-DU2 152 are responsible for real time Layer 1 and Layer 2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer 2 is the data link or protocol layer that defines how data packets are encoded and decoded, and how data is to be transferred between adjacent network nodes. Layer 3 is the network routing layer and defines how data moves across the physical network. gNB-DU1 150 is coupled to RU1 1 130, RU2 131, RU3 132, RU4, 133, RU5 134, and RU6 135 via Fronthaul connections 150. gNB-DU2 132 is coupled to RU7 1 136, and RU8 137 via Fronthaul connections 152.

gNB-DU1 150 and gNB-DU2 152 run the Radio Link Control (RLC), MAC, and parts of the Physical (PHY) layer. gNB-DU1 150 and gNB-DU2 152 include a subset of the eNB/gNB functions, depending on the functional split option, and operation of gNB-DU1 150 and gNB-DU2 152 are controlled by Centralized Unit (CU) 160.

gNB-CU 160 is responsible for non-real time, higher L2 and L3. Server and relevant software for gNB-CU 160 is able to be hosted at a site or is able to be hosted in an edge cloud (datacenter or central office) depending on transport availability and the interface for the Fronthaul connections 150, 152. The server and relevant software of gNB-CU 160 is also able to be co-located at gNB-DU1 150 or gNB-DU2 152, or is able to be hosted in a regional cloud data center.

The gNB-CU 160 handles the RRC and PDCP layers. gNB-CU 160 includes a gNB-CU-Control Plane (CU-CP) 162 and one or more gNB-CU-User Planes (CU-UP) 164, respectively. gNB-CU-CP 162 is a logical node hosting the RRC and the control plane part of the PDCP protocol of the gNB-CU 160 for gNB 100. A gNB-CU-UP 164 is a logical node hosting the user plane part of the PDCP protocol of the gNB-CU 160, and the user plane part of the PDCP protocol and the SDAP protocol of the gNB-CU 162.

gNB-CU 160 controls the operation of gNB-DU1 150 and gNB-DU2 152 over the Midhaul interface 170. gNB-DU1 150, and gNB-DU1 152 are connected to gNB-CU-CP 162 via F1-C 172, and gNB-DU1 150, and gNB-DU1 152 are connected to one or more gNB-CU-UP via F1-U 174 interfaces. The split architecture enables a 5G network to utilize different distribution of protocol stacks between gNB-CU 160, and gNB-DU1 150 and gNB-DU2 152, depending on network design and availability of the Midhaul connection 170. gNB-CU-CP 142 is coupled to one or more gNB-CU-UP 164 via one or more E1 interfaces 180.

In FIG. 1, two connections are shown between gNB-CU 160 and gNB-DU1 150 and gNB-DU2 152. gNB-CU 160 is able to implement additional connections to other gNB-DUs (not shown). gNB-CU 160, in 5G, is able to implement, for example, 256 endpoints or gNB-DUs. gNB-CU 160 supports the gNB functions such as transfer of user data, mobility control, RAN sharing (MORAN), positioning, session management, etc. However, one or more functions are able to be allocated to gNB-DU1 150 and gNB-DU2 152. Layer 1/Layer 2 (L1)/L2 Triggered Mobility (LTM) enables a serving cell change via L1/L2 signaling, while keeping configuration of the upper layers and/or minimizing changes of the configuration of the lower layers. LTM helps to reduce the latency, overhead and interruption time during handover.

As shown in FIG. 1, an outage 190 is able to occur at RU1 130 thereby resulting in loss of service for cell 140 until the hardware, e.g., RU1 130, is able to be replaced or the cause of the outage is resolved. Such an outage is able to last for several hours before the outage being resolved, which leaves cell 140 down. While one outage 190 is shown in FIG. 1, an outage due to a crisis, such as an earthquake, typhoon/hurricane, tornado, or other severe weather events), a political crisis (e.g., terrorist attacks, cyber-attacks, protests, etc.), other external crisis, human error (e.g., accidents during maintenance or upgrades), and the like, is able to impact a many cells. In addition, an outage, such as outage 190 is able to be caused by a problem with gNB-CU 140, gNB-DU1 150, gNB-DU2 152, or other components of the network 100. A management platform 106 is able to monitor the status of the network 100 and to automate a change in site MIMO configuration during a crisis. In at least one embodiment, a method for automating a change in site configuration during a crisis includes monitoring sites in a mobile network for power outages, determining a power outage for a plurality of the sites in the mobile network qualifies as a crisis, converting the plurality of the sites in the mobile network that are in a higher configuration to a lower configuration, determining whether a cause for the power outage of the plurality of the sites has been addressed, and in response to the cause for the power outage of the plurality of the sites being addressed, converting the plurality of the sites in the mobile network that were converted to the lower configuration to the higher configuration.

Figure 2:
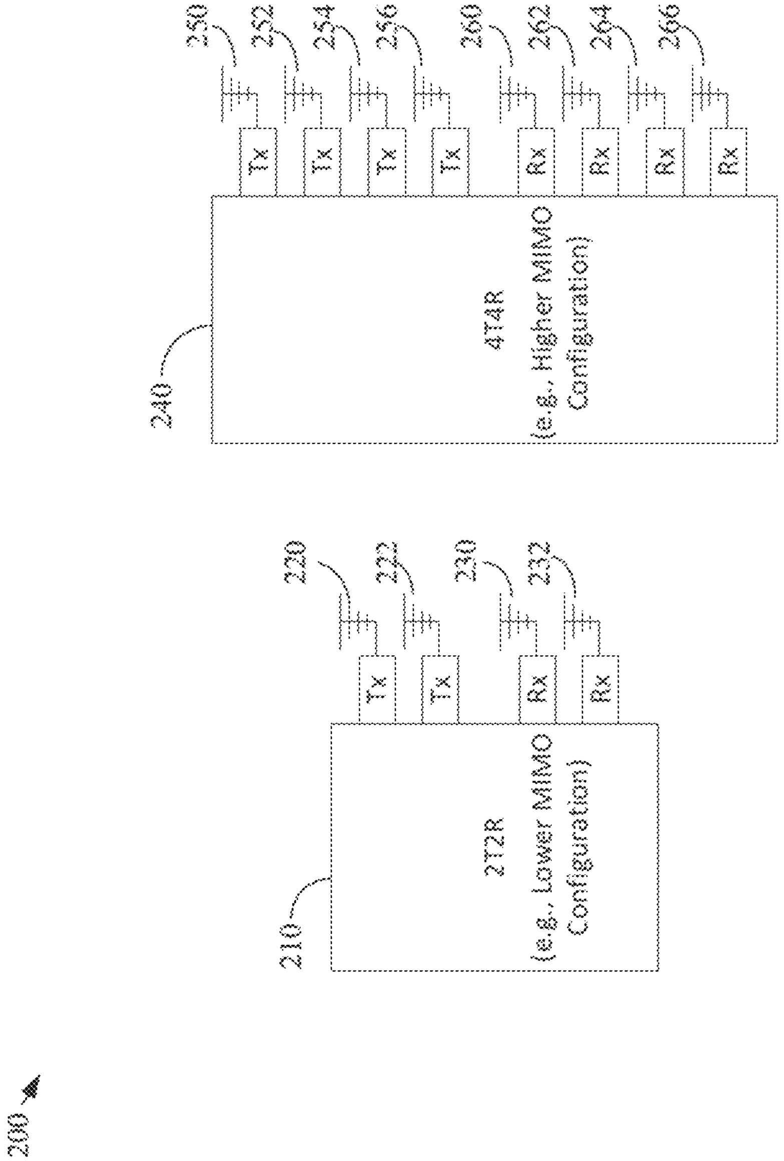
FIG. 2 illustrates a comparison of a 2T2R MIMO configuration to a 4T4R MIMO configuration according to at least one embodiment.

FIG. 2 illustrates a comparison 200 of a 2T2R MIMO configuration to a 4T4R MIMO configuration according to at least one embodiment.

Multiple Input Multiple Output is a technique to increase the data throughput by using multiple transmit antennas and multiple receive antennas. MIMO antennas are designated by the number of transmit and receive antennas used. FIG. 2 shows a 2T2R MIMO configuration 210 for communications between base stations and mobile phones that includes two transmit antennas 220, 222 and two receive antennas 230, 232. 2T2R MIMO configuration 210 is able to transmit two spatial data streams concurrently from the two transmit antennas 220, 222 of a base station to antennas of a mobile phone. Compared to ordinary single antenna networks, 2T2R MIMO configuration 210 offers up to a 100% increase in throughput. With two spatial streams established, the data payload to be transmitted by the two transmit antennas 220, 222 is divided across both transmit antennas and transmitted over the same frequency band.

FIG. 2 also shows a 4T4R MIMO configuration 240 that includes four transmit antennas 250, 252, 254, 256 and four receive antennas 260, 262, 264, 256. 4T4R MIMO configuration 240 doubles the capacity over the 2T2R MIMO configuration 210. In a 4T4R MIMO configuration, 240 four data streams are transmitted concurrently from the four transmit antennas 250, 252, 254, 256 of a base station to the four receive antennas of a mobile phone. 4T4R MIMO configuration 240 doubles the rate of traditional 2T2R MIMO configuration 210, enhances uplink coverage, and improves cell-edge experience. While FIG. 2 shows separate transmit antennas 220, 222/250, 252, 254, 256 and receive antennas 230, 232,/260, 262, 264, 266 for 2T2R MIMO configuration 210 and 4T4R MIMO configuration 240 respectively, in actual use, an antenna is both a transmit and receive antenna.

MIMO multiplies a radio link's number of users by using multiple transmission and receive antennas to take advantage of multi-path propagation. MIMO enables simultaneously sending and receiving more than just one data signal over a radio channel by using multi-path propagation. Thus, with MIMO, multiple independent data streams are transmitted simultaneously, and as a result MIMO is able to achieve much higher data throughput in comparison to SISO (Single Input Single Output) case. Although the larger the number of transmit and receive antennas is generally better, a larger number of antennas results in more demands on power, so there are tradeoffs. Those skilled in the art recognize that MIMO antennas are able to be configured for 8T84, 16T16R, 32T32R, 64T64R, 128T128R, etc.

Figure 3:
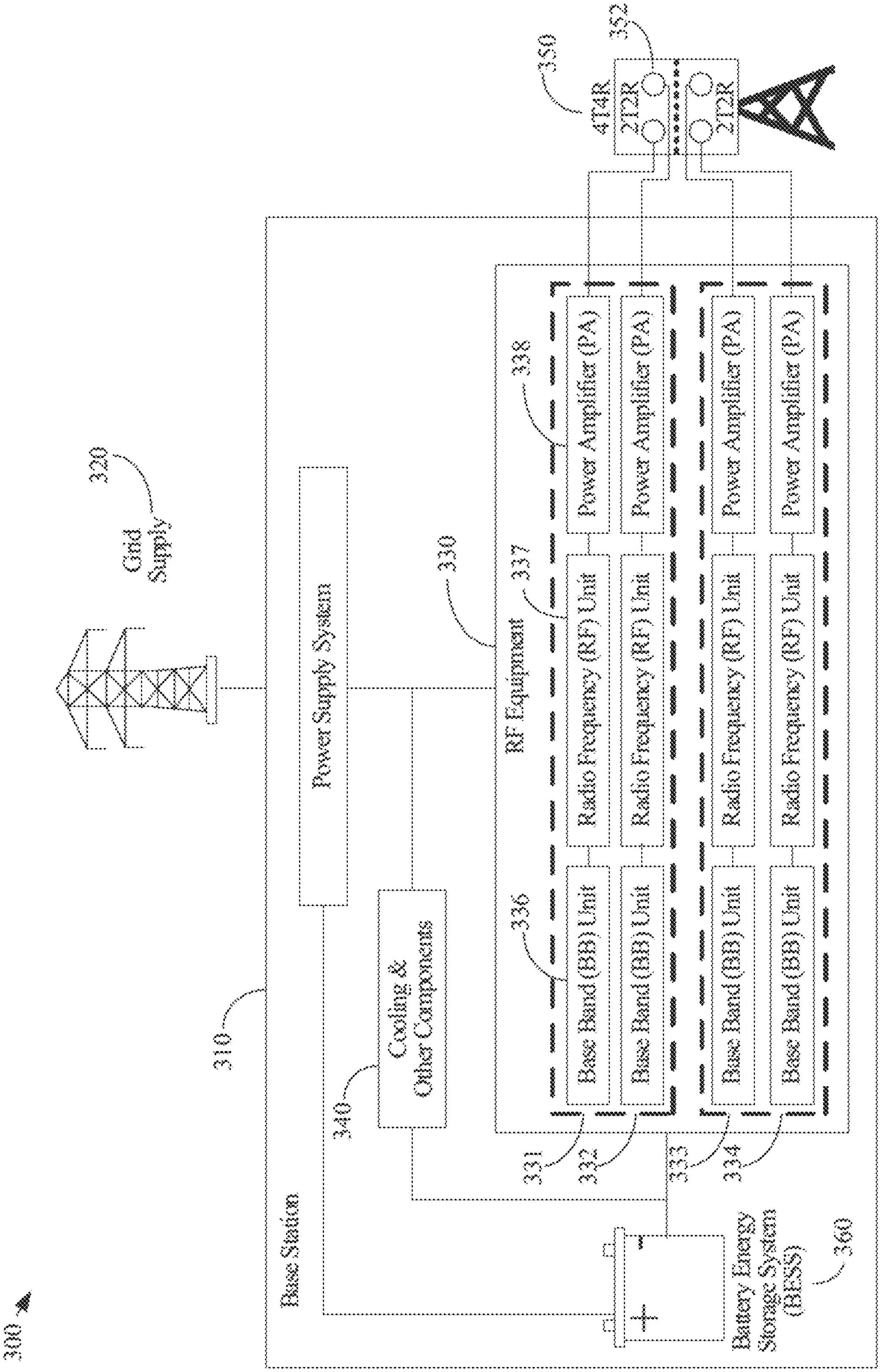
FIG. 3 illustrates a base station according to at least one embodiment.

FIG. 3 illustrates a base station 300 according to at least one embodiment.

In FIG. 3, the base station 300 includes a Power Supply System 310 that is coupled to a Grid Supply 320. The Power Supply System 310 manages the supply of power to the RF Equipment 330, and to Cooling & Other Components 340. RF Equipment 330 includes 4 paths 331, 332, 333, 334, wherein a path includes Basse Band (BB) Units 336, RF Units 337 and Power Amplifier (PA) 338. The RF Equipment 330 processes signals for transmission by an antenna 350 and signals received at the antenna 350. In FIG. 3, antenna 350 is shown as a 4T4R antenna. RF Equipment uses the 4 paths 331, 332, 333, 334 in response to the Base Station 300 being configured to operate in a 4T4R MIMO mode.

Battery Energy Storage System (BESS) 360 is coupled to Power Supply System 310, which provides a charge for BESS 360. BESS 360 is coupled to the RF Equipment 330. BESS 360 is also coupled to Cooling and Other Components 340. BESS 360 acts as a backup source for the RF Equipment 350 and the Cooling & Other Components 340 to facilitate continuous operation in case of a power outage. While BESS 360 in practice provides backup power to additional components of Base Station 300, herein the power consumption by Base Station 300 is based on the RF Equipment 330.

According to at least one embodiment, in response to a power outage, the Base Sation 300 is able to be configured in a 2T2R MIMO configuration 352 so that power is provided to 2 paths 331, 332 of RF Equipment 330 and not provided to 2 paths 333, 334 of RF Equipment 330. By providing power to paths 331, 332 of RF Equipment 330 for a 2T2R MIMO configuration 352 instead of providing power to 4 paths 331, 332, 333, 334 of RF Equipment 330, power consumption is able to be reduced by approximately 50%. By reducing power consumption by approximately 50%, the BESS 360 is able to increase the time that sustainable power is able to be provided to the Base Station 300, e.g., from approximately 3 hours to approximately 6 hours.

Figure 4:
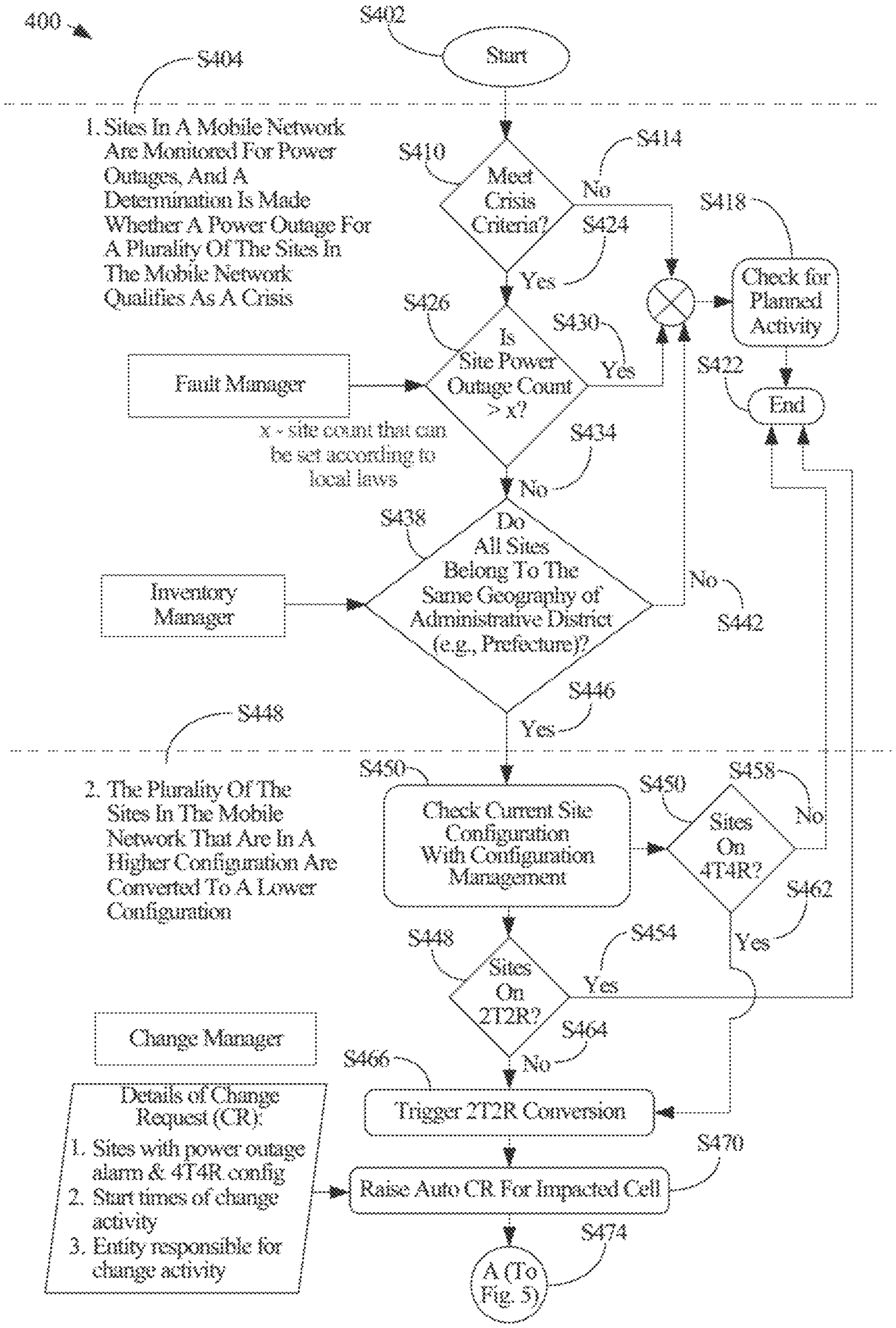
FIGS. 4-6 show a flowchart of a method for automating a change in site MIMO configuration during a crisis according to at least one embodiment.
Figure 5:
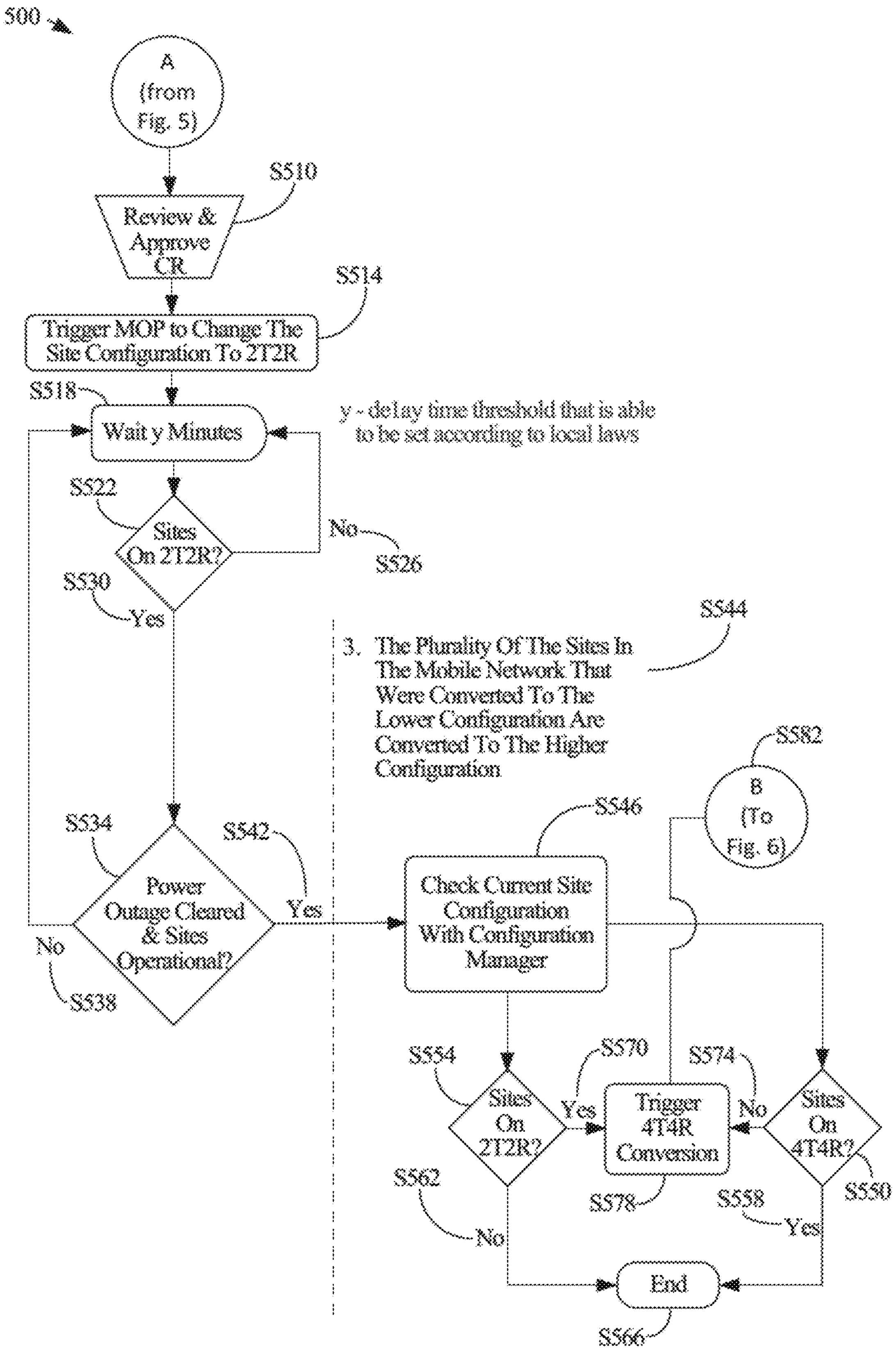
Figure 6:
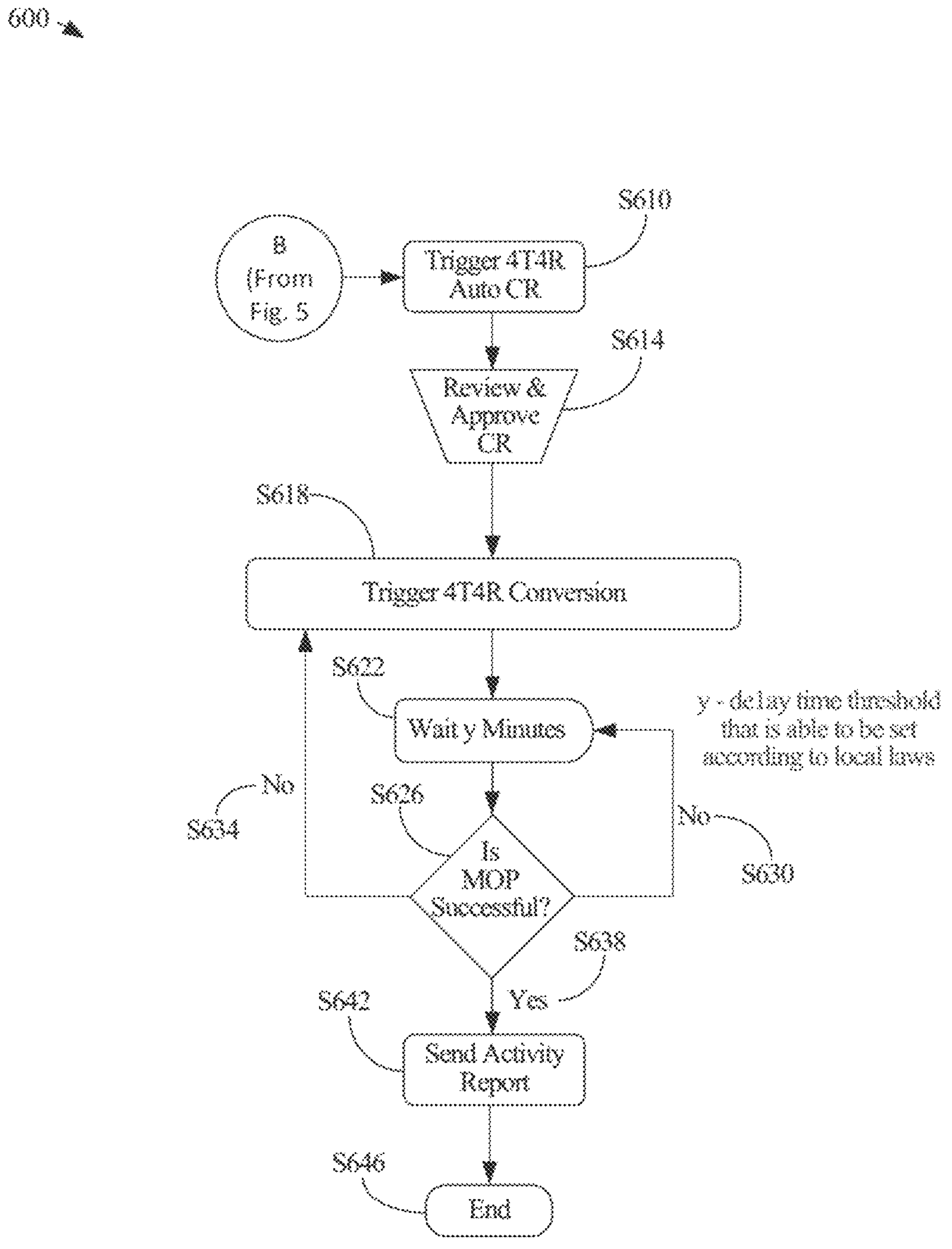

FIGS. 4-6 show a flowchart 400 of a method for automating a change in site MIMO configuration during a crisis according to at least one embodiment.

In FIG. 4, the processor starts S402, and sites in a mobile network are monitored for power outages, and a determination is made whether a power outage for a plurality of the sites in the mobile network qualifies as a crisis S404. Based on receiving an alert regarding power outage of sites in a mobile network, a determination is made whether crisis criteria is met S410. Herein, a site includes a base station, a data center, or other network elements. There are multiple causes for a site outage, e.g., hardware and software failures (radio board failure, channel processing implementation error, etc.), external failures such as power supply or network connectivity failures, or even erroneous configuration. A crisis due to power outage in a site is able to be characterized according to various components. For example, three major components are able to characterize a crisis. A first component includes identification of a cause of a crisis that results in a site outage. As described above, a crisis is able to be caused by a natural disaster (e.g., earthquake, typhoon/hurricane, tornado, or other severe weather event), a political crisis (e.g., terrorist attacks, cyber-attacks, protests, etc.), other external crisis, human error (e.g., accidents during maintenance or upgrades), and the like. Such events have an impact on the network that is able to result in site outages. Further, these events also have a direct impact on business. The cost may be different, but the impact is the same. A second component is the geography in which the crisis takes place. The third component is the level of impact the crisis has on the network. Thus, criteria or parameters associated with the crisis are determined, such as a number of site outages, a number of people impacted, and whether a high density area or low density area is involved. On the basis of these parameters, a determination is made whether a crisis is identified or whether the crisis is to be analyzed. The criteria is able to be specified for a region.

In response to the crisis criteria not being met S414, a check for planned activity is performed S418. Planned Activity refers to activities to be carried out on a site via a change request, and includes actions such as site upgrades, software updating, and the like. Checking for planned activity verifies whether the power outage alarm originates because of a crisis or because of other planned activity, such as a site upgradation, replacement, or other maintenance activity. Planned activities are able to cause a service outage at sites, but do not meet the criteria of a crisis. Operators are able to address any issues caused by planned activity. Cell outage compensation techniques involve adjusting radio parameters in surrounding sites, optimizing coverage and quality through tuning of parameters, such as radio parameter adjustments, and the like. Then, the process ends (e.g., the sites in the mobile network continue to be monitored) S422.

In response to the crisis criteria being met S424, a determination is made whether the number of sites experiencing a power outage meet a predetermined site power outage threshold "x" S426. For example, the site power outage threshold is able to be set to 50%. A Fault Manager helps Business Continuity Planning (BCP) track issues across a mobile network. The Fault Manager provides a number of total sites and the number of sites that are impacted by the crisis, e.g., the number of sites that experience a power outage. For example, in response to a major earthquake, a power outage is able to affect 50% of the sites. Sites often include a battery backup to provide power during a power outage. The battery backup provides a relatively short operation duration to a site, e.g., 3 to 6 hours of battery backup operation. In response to the site operating more than the time the battery backup is capable of supplying power to the site, the site will experience a loss of power and a service outage for an area serviced by the site occurs.

In response to the site power outage count meeting the predetermined site power outage threshold "x" S430, a check for planned activity is again performed S418. Then, the process ends (e.g., the sites in the mobile network continue to be monitored) S422.

In response to the site power outage count not meeting the predetermined site power outage threshold "x" S434, a determination is made whether the sites experiencing the power outage belong to the same geography/administrative district S438. An Inventory Manager is able to be used to provide information regarding site inventory including identification of an administrative district for a site.

In response to the sites experiencing the power outage not belonging to the same administrative district S442, a check for planned activity is again performed S418. Then, the process ends (e.g., the sites in the mobile network continue to be monitored) S422.

Next, the plurality of the sites in the mobile network that are in a higher configuration are converted to a lower configuration S448.

In response to the sites experiencing the power outage belonging to the same administrative district S446, a check is made regarding the current site MIMO configuration S450. The check is able to be performed automatically via a Configuration Manager. For example, a check is made to determine whether the configuration state of the site is in a higher MIMO configuration (e.g., 4T4R) S448, or a lower MIMO configuration (e.g., 2T2R) S450. 4T4R is a transmit and receive mode for communication between base stations and mobile phones using four transmit and four receive antennas (also referred to as 4×4 Multiple Input Multiple Output (MIMO) mode), and 2T2R uses 2 transmit and 2 receive antennas. While embodiments described herein are described using 4T4R as a higher MIMO configuration and 2T2R as a lower MIMO configuration, those skilled in the art recognize that other MIMO configurations are possible. For example, MIMO configurations are able to include 8T8R, 16T16R, 32T32R, 64T64R, 128T128R, and so on. Thus, according to at least one embodiment, a higher MIMO configuration is 32T32R and a lower MIMO configuration is 16T16R. Other combinations are also able to be implemented.

Thus, the Configuration Manager determines whether the system is in a higher MIMO configuration state, which consumes more battery capacity. For example, a site in a higher MIMO configuration is able to operate on battery backup for 3 hours. In response to the site being in a higher MIMO configuration (e.g., 4T4R), the configuration for the site is able to be converted to a lower MIMO configuration to increase operation time of sites using the lower MIMO configuration (e.g., 2T2R). For example, a site in a 4T4R MIMO configuration is able to be converted to a 2T4R MIMO configuration. By converting from the higher MIMO configuration to the lower MIMO configuration, the site is able to be powered for a longer time because the capacity of the battery backup is not depleted as quickly. A battery backup system provides power to the RF equipment, other base station components include cooling equipment, monitoring unit, water intrusion and leakage sensors, smoke, humidity, vibration, and temperature sensors, etc. However, for simplicity, embodiments herein are described based on consideration of the power usage of the RF equipment. Thus, a battery backup is described herein as providing a first timeline for providing power to a 4T4R site, e.g., 3 hours. Thus, converting from the higher MIMO configuration (e.g., 4T4R) to the lower MIMO configuration (e.g., 2T2R), the site is able to be powered for 6 hours.

In response to determining the site is using a lower MIMO configuration (e.g., 2T2R) S454 or the site is not using a higher MIMO configuration (e.g., 4T4R) S458, the process ends (e.g., the sites in the mobile network continue to be monitored) S422.

In response to the site being in a higher MIMO configuration S462 (thereby resulting in higher power consumption), or the site not being in a lower MIMO conversion S464, a conversion from the higher MIMO configuration (e.g., 4T4R) to a lower MIMO configuration (e.g., 2T2R) is triggered S466.

In response to conversion from the higher MIMO configuration (e.g., 4T4R) to a lower MIMO configuration (e.g., 2T2R) being triggered S466, an Auto Change Request (CR) is raised S470. A Change Manager implements change request software. Guidelines involving interaction with a site are provided for implementing change activity. The change activity is recorded. The change activity also involves the site MIMO configuration change that is to be carried out and details are able to be added to the change request, such as the addition of sites involved in the site MIMO configuration change, the time of the activity and the entity implementing the change activity (e.g., person or automated system robot). Using this information, the CR is automatically created via an API in the Change Manager. Details of the CR include the details of the site that was fetched at the beginning of the process, e.g., the details of the site, identification of the alarm, and the change to be carried out. Input is provided by the management tool and provided to raise the Auto CR. The Auto CR obtained from a Change Manager specifies changes that are to be made. The Auto CR is able to include identification of: 1. sites with power outage alarm and 4T4R MIMO configuration, 2. start times of change activity, 3. identification of an entity responsible for the change activity, and the like. The Auto CR changes from a higher MIMO configuration (e.g., 4T4R) to a lower MIMO configuration (e.g., 2T2R) for the sites that were fetched earlier.

The process then moves to A in FIG. 5 S474.

In FIG. 5, the Auto CR is reviewed and manually approved S510. The manual approval involves determining whether the criteria is correct and that the parameters are correct.

In response to the CR being approved, a Method of Procedure (MOP) is executed to implement the CR, and change the site MIMO configuration to 2T2R S514. The MOP is a script (e.g., a Python script) that converts the MIMO configuration of a site using an API in a Configuration Manager. The MOP defines a set of distinct protocols and codes that are executed to implement the CR.

Once the site MIMO configuration is changed, a time delay of "y" is used to monitor the completion of the changes S518. The change of the configuration to the lower MIMO configuration reduces battery capacity utilization by approximately 50%. The actual reduction is capable of being slightly different than a 50% reduction in battery utilization. Thus, in response to having a 3-hour battery standby time for a higher MIMO configuration, the battery standby time after the conversion from the higher MIMO configuration (e.g., 4T4R) to the lower MIMO configuration is increased to approximately 6 hours. The increase in battery standby time provides the site recovery team more time to fix power outages of the identified sites.

A determination is made whether the sites per the CR have been changed to 2T2R S522.

In response to the sites per the CR not being changed to 2T2R S526, the process continues to monitor the completion of the changes during the time delay of "y" S518.

In response to the sites per the CR being changed to 2T2R S530, a determination is made whether the external alarms have been cleared and whether the identified sites are operational (e.g., able to operate in the higher configuration) S534. External alarms refer to alarms associated with the sites identified experiencing a power outage.

In response to the external alarms not being cleared and the identified sites not being operational S538, the process returns to monitor the completion of the changes during the time delay of "y" S518.

In response to the cause for the power outage of the plurality of the sites being addressed S542 (e.g., the external alarms being cleared and the identified sites being operational), the plurality of the sites in the mobile network that were converted to the lower configuration are converted to the higher configuration S544.

A check is made using the Configuration Manager of a current site MIMO configuration S546.

A check is made to determine whether the site is in a higher MIMO configuration (e.g., 4T4R) S550, or whether the site is in a lower MIMO configuration (e.g., 2T2R) S554.

In response to the power being restored and a site being in a higher MIMO configuration (e.g., 4T4R) S558, or a site not being in a lower MIMO configuration (e.g., 2T2R) S562, the process ends (e.g., the sites in the mobile network continue to be monitored) S566.

In response to the power being restored and a site being in a lower MIMO configuration (e.g., 2T2R) S570, or the site not being in a higher MIMO configuration (e.g., 4T4R) S574, conversion to the higher MIMO configuration is triggered S578.

The process then moves to B in FIG. 6 S582.

In FIG. 6, an Auto CR to covert a site to a higher MIMO configuration is triggered S610. Again, the Auto CR is reviewed and manually approved S614.

In response to the CR being approved, conversion to the higher MIMO configuration (e.g., 2T2R to 4T4R) is executed to implement the CR for changing the site MIMO configuration to the higher MIMO configuration S618.

Once the site MIMO configuration is changed, a time delay of "y" is used to monitor the completion of the changes S622.

A determination is made whether the MOP for changing the configuration to the higher MIMO configuration is successful S626.

In response to the conversion of the site to the higher MIMO configuration not being successful S630, the process continues to wait S622 or triggers a conversion of the site configuration to the higher MIMO configuration S634.

In response to the conversion of the site to the higher MIMO configuration being successful S638, an Activity Report is generated S642. The Activity Report includes information regarding the process for handling the crisis such as identification of the sites involved with implementation of the configuration change, the CR number, a script report of the log of the activities, identification of sites implementing a successful configuration change, and the like.

The process then ends (e.g., the sites in the mobile network continue to be monitored) S646.

At least one embodiment of the method for automating a change in site configuration during a crisis includes monitoring a sites in a mobile network for power outages, determining a power outage for a plurality of the sites in the mobile network qualifies as a crisis, converting the plurality of the sites in the mobile network that are in a higher configuration to a lower configuration, determining whether a cause for the power outage of the plurality of the sites has been addressed, and in response to the cause for the power outage of the plurality of the sites being addressed, converting the plurality of the sites in the mobile network that were converted to the lower configuration to the higher configuration.

Figure 7:
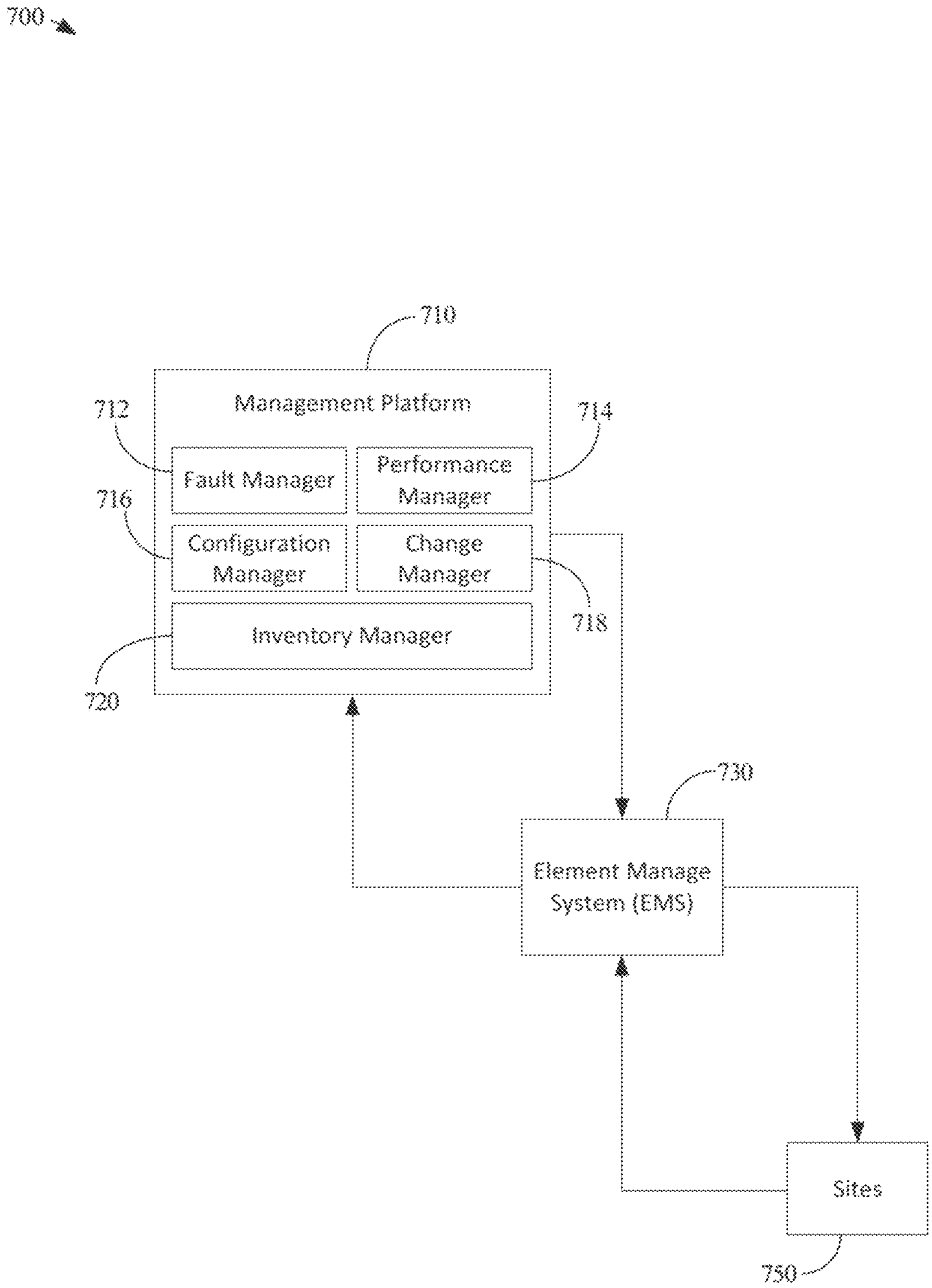
FIG. 7 illustrates a system for automating a change in site configuration during a crisis according to at least one embodiment.

FIG. 7 illustrates system 700 for automating a change in site configuration during a crisis according to at least one embodiment.

In FIG. 7, a Management Platform 710 is coupled to an Element Management System (EMS) 730. EMS 730 is coupled to Sites 750. In at least one embodiment, a Management Platform 710 includes a Fault Manager 712, a Performance Manager 714, a Configuration Manager 716, a Change Manager 718, and an Inventory Manager 720.

In terms of implementation, Configuration Manager 716 is implemented on a server that has access to the network. The Configuration Manager 716 provides comprehensive management of network parameters, enables remote configuration of work orders for multiple sites, and generates a daily basis audit that reflects any mismatch between RAN golden parameters current and golden value.

EMS 730 extracts statistical files/raw data, cleans, and feeds in almost real-time. EMS 730 changes the configuration of Sites 750. The Configuration Manager 716 triggers the change to be made by the EMS 730 and the EMS changes the configuration of Sites 750. The Sites 750 report back to the EMS 730. The EMS 730 reports back to the Configuration Manager 716.

Performance Manager 714 provides users with near real-time insights into health and performance of the mobile network. Performance Manager 714 collects raw data either directly from the network devices or through EMS 730. Performance Manager 714 is customizable through user-defined KPIs and thresholds and a business intelligence framework for reporting functions and dashboards.

Fault Manager 712 provides an automated mechanism to monitor and manage network wide faults. Fault Manager 712 simplifies the process of network alert management by implementing advanced alert monitoring capabilities. Fault Manager 712 helps telecom operators quickly identify the root cause of the problem, ideally before end-users notice it.

Inventory Manager 720 provides visualization of network resources (logical, physical and service), reports of inventory data, inventory reconciliation of network resources, and near real-time inventory data updates. The Fault Manager obtains the power outage information. The Fault Manager 712 identifies Sites 750 based on geography of the Sites 750 provided by Inventory Manager 720.

Change Manager 718 implements change request software. Guidelines involving interaction with a site are provided for implementing change activity. The change activity is recorded. The change activity also involves the site MIMO configuration change that is to be carried out and details are able to be added to the change request, such as the addition of sites involved in the site MIMO configuration change, the time of the activity and the entity implementing the change activity (e.g., person or automated system robot). Using this information, the CR is automatically created via an API in the Change Manager 718. Details of the CR include the details of the site that was fetched at the beginning of the process, e.g., the details of the site, identification of the alarm, and the change to be carried out. Input is provided by the management tool and provided to raise the Auto CR. The Auto CR obtained from a Change Manager 718 specifies changes that are to be made. The Auto CR is able to include identification of: 1. sites with power outage alarm and 4T4R MIMO configuration, 2. start times of change activity, 3. identification of an entity responsible for the change activity, and the like. The Auto CR changes from a higher MIMO configuration (e.g., 4T4R) to a lower MIMO configuration (e.g., 2T2R) for the sites that were fetched earlier.

According to at least one embodiment, a change in site configuration during a crisis is automated by monitoring a sites in a mobile network for power outages. A determination is made whether a power outage for a plurality of the sites in the mobile network qualifies as a crisis by determining whether the power outage for the plurality of the sites in the mobile network satisfies a crisis criteria. Data regarding the power outage for the plurality of the sites in the mobile network is obtained. Based on the data, a determination is made whether a count of the plurality of the sites experiencing the power outage is greater than a predetermined count threshold. Based on the count being greater than the predetermined count threshold, a determination is made whether the plurality of the sites experiencing the power outage are associated with a same geography/administrative district. A determination is made whether the plurality of the sites in the mobile network experience the power outage based on planned activity. The plurality of the sites in the mobile network that are in a higher configuration are converted to a lower configuration. A check is made whether a current configuration of the plurality of the sites in the mobile network experiences the power outage. A determination is made whether the sites experiencing the power outage are in the higher configuration or the lower configuration. The sites experiencing the power outage that are in the higher configuration are converted to the lower configuration by executing a change request. A determination is made whether a cause for the power outage of the plurality of the sites has been addressed. After waiting for a predetermined delay time threshold, a determination is made whether an external alarm for the power outage of the plurality of the sites converted to the lower configuration has been cleared and whether the plurality of the sites converted to the lower configuration are able to operate in the higher configuration. In response to the cause for the power outage of the plurality of the sites being addressed, the plurality of the sites in the mobile network that were converted to the lower configuration are converted to the higher configuration. A conversion is triggered for converting the plurality of the sites in the mobile network in the lower configuration to the higher configuration. A change request is executed for converting the sites in the mobile network that were converted from the lower configuration to the higher configuration. Upon successful conversion of the sites from the lower configuration to the higher configuration, an activity report detailing information regarding handling the crisis is sent. The sites in the mobile network continue to be monitored for power outages.

Figure 8:
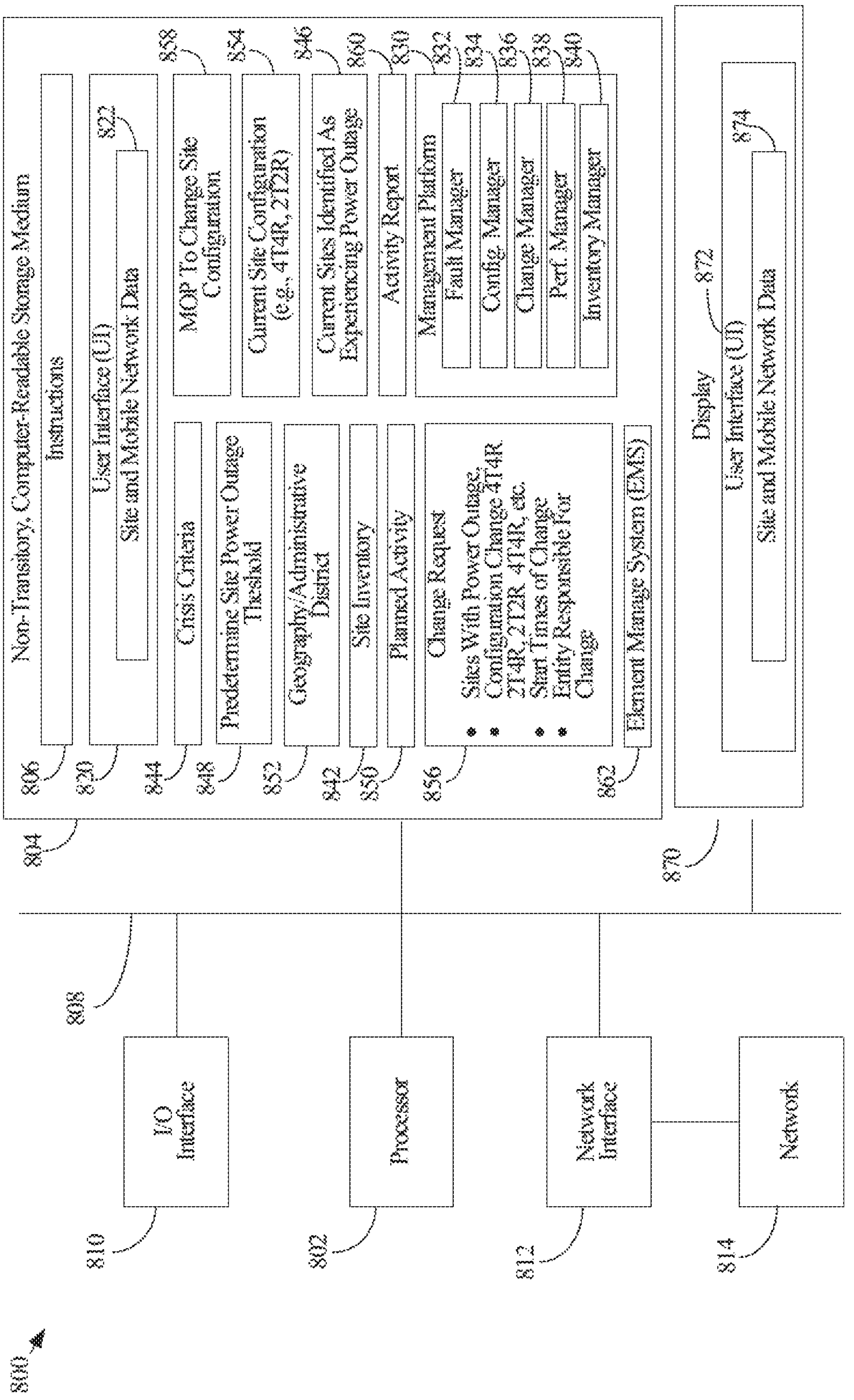
FIG. 8 is a high-level functional block diagram of a processor-based system according to at least one embodiment.

FIG. 8 is a high-level functional block diagram of a processor-based system 800 according to at least one embodiment.

In at least one embodiment, processing circuitry 800 automates a change in site configuration during a crisis. Processing circuitry 800 implements a method for automating a change in site configuration during a crisis using Processor 802. Processing circuitry 800 also includes a Non-Transitory, Computer-Readable Storage Medium 804 that is used to implement a method for automating a change in site configuration during a crisis. Non-Transitory, Computer-Readable Storage Medium 804, amongst other things, is encoded with, i.e., stores, Instructions 806, i.e., computer program code, that are executed by Processor 802 causes Processor 802 to perform operations for a method for automating a change in site configuration during a crisis. Execution of Instructions 806 by Processor 802 represents (at least in part) an application which implements at least a portion of the methods described herein in accordance with one or more embodiments (hereinafter, the noted processes and/or methods).

Processor 802 is electrically coupled to Non-Transitory, Computer-Readable Storage Medium 804 via a Bus 808. Processor 802 is electrically coupled to an Input/Output (I/O) Interface 810 by Bus 808. A Network Interface 812 is also electrically connected to Processor 802 via Bus 808. Network Interface 812 is connected to a Network 814, so that Processor 802 and Non-Transitory, Computer-Readable Storage Medium 804 connect to external elements via Network 814. Processor 802 is configured to execute Instructions 806 encoded in Non-Transitory, Computer-Readable Storage Medium 804 to cause processing circuitry 800 to be usable for performing at least a portion of the processes and/or methods. In one or more embodiments, Processor 802 is a Central Processing Unit (CPU), a multi-processor, a distributed processing system, an Application Specific Integrated Circuit (ASIC), and/or a suitable processing unit.

Processing circuitry 800 includes I/O Interface 810. I/O interface 810 is coupled to external circuitry. In one or more embodiments, I/O Interface 810 includes a keyboard, keypad, mouse, trackball, trackpad, touchscreen, and/or cursor direction keys for communicating information and commands to Processor 802.

Processing circuitry 800 also includes Network Interface 812 coupled to Processor 802. Network Interface 812 allows processing circuitry 800 to communicate with Network 814, to which one or more other computer systems are connected. Network Interface 812 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 800 is configured to receive information through I/O Interface 810. The information received through I/O Interface 810 includes one or more of instructions, data, design rules, libraries of cells, and/or other parameters for processing by Processor 802. The information is transferred to Processor 802 via Bus 808. Processing circuitry 800 is configured to receive information related to a User Interface (UI) 820 through I/O Interface 810. Processing circuitry 800 is configured to process Site and Mobile Network Data 822 to automate a change in site configuration during a crisis.

In one or more embodiments, one or more Non-Transitory, Computer-Readable Storage Medium 804 having stored thereon Instructions 806 (in compressed or uncompressed form) that may be used to program a computer, processor, or other electronic device) to perform processes or methods described herein. The one or more Non-Transitory, Computer-Readable Storage Medium 804 include one or more of an electronic storage medium, a magnetic storage medium, an optical storage medium, a quantum storage medium, or the like.

For example, the Non-Transitory, Computer-Readable Storage Medium 804 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 804 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 804 stores Instructions 806 configured to cause Processor 802 to perform at least a portion of the processes and/or methods for automating a change in site configuration during a crisis. In one or more embodiments, Non-Transitory, Computer-Readable Storage Medium 804 also stores information, such as algorithm which facilitates performing at least a portion of the processes and/or methods for automating a change in site configuration during a crisis. Accordingly, in at least one embodiment, Processor 802 executes Instructions 806 stored on the one or more Non-Transitory, Computer-Readable Storage Medium 804 to implement a Management Platform 830 including a Fault Manager 832, a Configuration Manager 834, a Change Manager 836, a Performance Manager 838, and an Inventory Manager 840. Processor 802 determines whether outage of sites from Site Inventory 842 is to be characterized as a crisis based on Crisis Criteria 844. Crisis Criteria 844 includes various components that are used to determine whether power outage to sites is to be characterized as a crisis. For example, three major components are able to characterize a crisis. A first component includes identification of a cause of a crisis that results in a site outage. As described above, a crisis is able to be caused by a natural disaster (e.g., earthquake, typhoon/hurricane, tornado, or other severe weather event), a political crisis (e.g., terrorist attacks, cyber-attacks, protests, etc.), other external crisis, human error (e.g., accidents during maintenance or upgrades), and the like. Such events have an impact on the network that is able to result in site outages. A second component is the geography in which the crisis takes place. The third component is the level of impact the crisis has on the network. Thus, criteria or parameters associated with the crisis are determined, such as a number of site outages, a number of people impacted, whether a high density area or low density area is involved. On the basis of these parameters, a determination is made whether a crisis is identified or whether the crisis is to be analyzed. A count of Sites Experiencing A Power Outage 846 is compared to a Predetermined Site Power Outage Threshold 848, e.g., 50%. Management Platform 840 includes a Fault Manager 832 for tracking issues across a mobile network. The Fault Manager 830 provides a number of total sites and the number of sites that are impacted by the crisis, e.g., the number of sites that experience a power outage. For example, in response to a major earthquake, a power outage is able to affect 50% of the sites. Sites often include a battery backup to provide power during a power outage. The battery backup provides a relatively short operation duration to a site, e.g., 3 to 6 hours of battery backup operation. In response to the site operating more than the time the battery backup is capable of supplying power to the site, the site will experience a loss of power and a service outage for an area serviced by the site occurs. Processor 802 performs a check regarding Planned Activity 850 is performed. Processor 802 determines whether the sites experiencing the power outage belong to the same Geography/Administrative District 852. Processor 802 implements Inventory Manager 840 to provide information regarding Site Inventory 842 including identification of a geographic location or administrative district for the affected sites. Processor 802 checks the current Site MIMO Configuration 854. Processor 802 implements Configuration Manager 834 to automatically determine whether the current Site MIMO Configuration 854 is in a higher MIMO configuration, e.g., 4T4R, or a lower MIMO configuration, e.g., 2T2R. The Configuration Manager 834 determines whether the system is in a higher MIMO configuration state, which consumes more battery capacity. Processor 802 triggers conversion of a site from a higher MIMO configuration (e.g., 4T4R) to a lower MIMO configuration (e.g., 2T2R). Processor 802 implements Change Manager 836 for implementing Change Request 856. The Change Request 856 includes identification of: 1. sites with power outage alarm and 4T4R MIMO configuration, 2. start times of change activity, 3. identification of an entity responsible for the change activity, and the like. The Change Request 856 is executed to change sites from a higher MIMO configuration (e.g., 4T4R) to a lower MIMO configuration (e.g., 2T2R). Upon approval of the Change Request 856, Processor 802 executes a Method of Procedure (MOP) 858 to implement the Change Request 856 to change the site MIMO configuration from a higher MIMO configuration (e.g., 4T4R) to a lower MIMO configuration (e.g., 2T2R). The change of the configuration to the lower MIMO configuration reduces battery capacity utilization by approximately 50%. Processor 802 determines whether the sites per the Change Request 856 have been changed to the lower MIMO configuration, e.g., 2T2R. Processor 802 determines whether external alarms have been cleared and whether the identified sites are operational. External alarms refer to alarms associated with the sites identified experiencing a power outage. Once the Processor 802 determines that the external alarms have been cleared and the identified sites are operational, Processor 802 triggers conversion of the sites to a higher MIMO configuration (e.g., 4T4R). Processor 802 executes a Change Request 856 to convert to the higher MIMO configuration (e.g., 2T2R to 4T4R). Processor 802 determines whether the MOP 858 for changing the configuration to the higher MIMO configuration is successful. Once the conversion of the sites to the higher MIMO configuration is successful, the Processor 802 generates an Activity Report 860. The Activity Report 860 includes information regarding the process for handling the crisis such as identification of the sites involved with implementation of the configuration change, the number of the Change Request 856, a script report of the log of the activities, identification of sites implementing a successful configuration change, and the like. Processor 802 uses Configuration Manager 834 to trigger a change to be made by Element Management System (EMS) 862 and the EMS 862 changes the configuration of sites. The sites report back to the EMS 862. The EMS 862 reports back to the Configuration Manager 834. Processor 802 implements Performance Manager 838 to provide users with near real-time insights into health and performance of the mobile network. Processor 802 causes Performance Manager 838 to collect raw data either directly from the network devices or through EMS 862. Processor 802 implements Fault Manager 832 to provide an automated mechanism to monitor and manage network wide faults. Fault Manager 832 provides alert monitoring capabilities to enable identification of the root cause of the problem, ideally before end-users notice it. Processor 802 implements Inventory Manager 840 to provide visualization of network resources (logical, physical and service), reports of inventory data, inventory reconciliation of network resources, and near real-time inventory data updates. Processor 802 causes Fault Manager 832 to obtain the power outage information, and to identify sites based on Geography/Administrative District 852 provided by Inventory Manager 840. Processor 802 implements Change Manager 836 for implementing change activity including a site MIMO configuration change that is to be carried out. A Display 870 presents a User Interface (UI) 872 that shows Site and Mobile Network Data 874.

Embodiments described herein provide a method that provides one or more advantages. For example, automating a change in site configuration during a crisis provides a faster solution than manual intervention, which is slow to react to crisis situations or other situations resulting in power disruption.

An aspect of this description is directed to a method [1] for automating a change in site configuration during a crisis includes monitoring a sites in a mobile network for power outages, determining a power outage for a plurality of the sites in the mobile network qualifies as a crisis, converting the plurality of the sites in the mobile network that are in a higher configuration to a lower configuration, determining whether a cause for the power outage of the plurality of the sites has been addressed, and in response to the cause for the power outage of the plurality of the sites being addressed, converting the plurality of the sites in the mobile network that were converted to the lower configuration to the higher configuration.

The method described in [1], wherein the determining the power outage for the plurality of the sites in the mobile network qualifies as the crisis includes determining the power outage for the plurality of the sites in the mobile network satisfies a crisis criteria, obtaining data regarding the power outage for the plurality of the sites in the mobile network, based on the data, determining a count of the plurality of the sites experiencing the power outage is greater than a predetermined count threshold, and based on the count of the plurality of the sites experiencing the power outage being greater than the predetermined count threshold, determining the plurality of the sites experiencing the power outage are associated with a same geography/administrative district.

The method described in any one of [1] or [2], further includes determining the power outage for the plurality of the sites in the mobile network does not satisfy the crisis criteria, determining the count of the plurality of the sites experiencing the power outage is not greater than the predetermined count threshold, or determining the plurality of the sites experiencing the power outage are not associated with the same geography/administrative district, and, in response, determining whether the plurality of the sites in the mobile network experience the power outage based on planned activity, and after determining whether the plurality of the sites in the mobile network experience the power outage based on planned activity, return to the monitoring the sites in the mobile network for power outages.

The method described in any one of [1] to [3], wherein the determining the power outage for the plurality of the sites in the mobile network qualifies as the crisis includes analyzing predetermined crisis parameters to determine whether the power outage for the plurality of the sites in the mobile network qualifies as the crisis, wherein the predetermined crisis parameters include one or more of the cause of the power outage to the plurality of the sites, a geography in which the power outage to the plurality of the sites occurs, a number of site experiencing the power outage, a number of people impacted by the power outage of the plurality of the sites, characterization of the geography of the plurality of the sites as a high density area or low density area, or a level of impact of the power outage of the plurality of the sites has on the mobile network.

The method described in any one of [1] to [4], wherein the converting the plurality of the sites in the mobile network that are in the higher configuration to the lower configuration includes checking a current configuration of the plurality of the sites in the mobile network experiencing the power outage, determining whether the sites experiencing the power outage are in the higher configuration or the lower configuration, in response to the sites experiencing the power outage being in the lower configuration, returning to monitor the sites in the mobile network for power outages, in response to the sites experiencing the power outage being in the higher configuration, triggering a conversion of the sites to the lower configuration, executing a change request to convert the sites experiencing the power outage and in the higher configuration to the lower configuration, and waiting for a predetermined delay time threshold for the sites experiencing the power outage and in the higher configuration to be converted to the lower configuration.

The method described in any one of [1] to [5], wherein the determining whether the cause for the power outage of the plurality of the sites has been addressed includes, after waiting for the predetermined delay time threshold for the sites experiencing the power outage and in the higher configuration to be converted to the lower configuration, determining whether an external alarm for the power outage of the plurality of the sites converted to the lower configuration has been cleared and whether the plurality of the sites converted to the lower configuration are able to operate in the higher configuration, in response to the external alarm for the power outage of the plurality of the sites converted to the lower configuration not being cleared and the plurality of the sites converted to the lower configuration not being able to operate in the higher configuration, continue to wait the predetermined delay time threshold, and in response to the external alarm for the power outage of the plurality of the sites converted to the lower configuration being cleared and the plurality of the sites converted to the lower configuration being able to operate in the higher configuration, checking a current configuration for the plurality of the sites.

The method described in any one of [1] to [6], wherein the converting the plurality of the sites in the mobile network that were converted to the lower configuration to the higher configuration includes triggering a conversion of the plurality of the sites in the mobile network in the lower configuration to the higher configuration, in response to the triggering the conversion of the plurality of the sites in the mobile network in the lower configuration to the higher configuration, generate a change request for converting the sites in the mobile network that were converted to the lower configuration to the higher configuration, in response to the change request being approved, executing the change request to convert the sites in the mobile network that were converted to the lower configuration to the higher configuration, waiting for a predetermined delay time threshold for the sites experiencing the power outage and in the lower configuration to be converted to the higher configuration, determining whether the conversion of the sites experiencing the power outage and in the lower configuration to the higher configuration was successful, in response to the conversion of the sites experiencing the power outage and in the lower configuration to the higher configuration not being successful, continue to wait for the predetermined delay time threshold or retriggering the executing of the change request to convert conversion of the sites experiencing the power outage and in the lower configuration to the higher configuration, and in response to the conversion of the sites experiencing the power outage and in the lower configuration to the higher configuration being successful, sending an activity report detailing information regarding handling the crisis and returning to the monitoring the sites in the mobile network for power outages.

An aspect of this description is directed to a device [8], including a memory storing computer-readable instructions, and a processor connected to the memory, wherein the processor is configured to execute the computer-readable instructions to perform operations to monitor sites in a mobile network for power outages, determine a power outage for a plurality of the sites in the mobile network qualifies as a crisis, convert the plurality of the sites in the mobile network that are in a higher configuration to a lower configuration, determine whether a cause for the power outage of the plurality of the sites has been addressed, and in response to the cause for the power outage of the plurality of the sites being addressed, convert the plurality of the sites in the mobile network that were converted to the lower configuration to the higher configuration.

The device described in [8], wherein the processor is further configured to determine the power outage for the plurality of the sites in the mobile network qualifies as the crisis by determining the power outage for the plurality of the sites in the mobile network satisfies a crisis criteria, obtaining data regarding the power outage for the plurality of the sites in the mobile network, based on the data, determining a count of the plurality of the sites experiencing the power outage is greater than a predetermined count threshold, and based on the count of the plurality of the sites experiencing the power outage being greater than the predetermined count threshold, determining the plurality of the sites experiencing the power outage are associated with a same geography/administrative district.

The device described in any one of [8] or [9], wherein the processor is further configured to determine the power outage for the plurality of the sites in the mobile network does not satisfy the crisis criteria, determining the count of the plurality of the sites experiencing the power outage is not greater than the predetermined count threshold, or determining the plurality of the sites experiencing the power outage are not associated with the same geography/administrative district, and, in response, determining whether the plurality of the sites in the mobile network experience the power outage based on planned activity, and after determining whether the plurality of the sites in the mobile network experience the power outage based on planned activity, return to the monitoring the sites in the mobile network for power outages.

The device described in any one of [8] to [10], wherein the processor is further configured to determine the power outage for the plurality of the sites in the mobile network qualifies as the crisis by analyzing predetermined crisis parameters to determine whether the power outage for the plurality of the sites in the mobile network qualifies as the crisis, wherein the predetermined crisis parameters include one or more of the cause of the power outage to the plurality of the sites, a geography in which the power outage to the plurality of the sites occurs, a number of site experiencing the power outage, a number of people impacted by the power outage of the plurality of the sites, characterization of the geography of the plurality of the sites as a high density area or low density area, or a level of impact of the power outage of the plurality of the sites has on the mobile network.

The device described in any one of [8] to [11], wherein the processor is further configured to convert the plurality of the sites in the mobile network that are in the higher configuration to the lower configuration by checking a current configuration of the plurality of the sites in the mobile network experiencing the power outage, determining whether the sites experiencing the power outage are in the higher configuration or the lower configuration, in response to the sites experiencing the power outage being in the lower configuration, returning to monitor the sites in the mobile network for power outages, in response to the sites experiencing the power outage being in the higher configuration, triggering a conversion of the sites to the lower configuration, executing a change request to convert the sites experiencing the power outage and in the higher configuration to the lower configuration, and waiting for a predetermined delay time threshold for the sites experiencing the power outage and in the higher configuration to be converted to the lower configuration.

The device described in any one of [8] to [12], wherein the processor is further configured to determine whether the cause for the power outage of the plurality of the sites has been addressed by after waiting for the predetermined delay time threshold for the sites experiencing the power outage and in the higher configuration to be converted to the lower configuration, determining whether an external alarm for the power outage of the plurality of the sites converted to the lower configuration has been cleared and whether the plurality of the sites converted to the lower configuration are able to operate in the higher configuration, in response to the external alarm for the power outage of the plurality of the sites converted to the lower configuration not being cleared and the plurality of the sites converted to the lower configuration not being able to operate in the higher configuration, continue to wait the predetermined delay time threshold, and in response to the external alarm for the power outage of the plurality of the sites converted to the lower configuration being cleared and the plurality of the sites converted to the lower configuration being able to operate in the higher configuration, checking the current configuration for the plurality of the sites.

The device described in any one of [8] to [13], wherein the processor is further configured to convert the plurality of the sites in the mobile network that were converted to the lower configuration to the higher configuration by triggering a conversion of the plurality of the sites in the mobile network in the lower configuration to the higher configuration, in response to the triggering the conversion of the plurality of the sites in the mobile network in the lower configuration to the higher configuration, generate a change request for converting the sites in the mobile network that were converted to the lower configuration to the higher configuration, in response to the change request being approved, executing the change request to convert the sites in the mobile network that were converted to the lower configuration to the higher configuration, waiting for a predetermined delay time threshold for the sites experiencing the power outage and in the lower configuration to be converted to the higher configuration, determining whether the conversion of the sites experiencing the power outage and in the lower configuration to the higher configuration was successful, in response to the conversion of the sites experiencing the power outage and in the lower configuration to the higher configuration not being successful, continue to wait for the predetermined delay time threshold or retriggering the executing of the change request to convert conversion of the sites experiencing the power outage and in the lower configuration to the higher configuration, and in response to the conversion of the sites experiencing the power outage and in the lower configuration to the higher configuration being successful, sending an activity report detailing information regarding the process for handling the crisis and returning to the monitoring the sites in the mobile network for power outages.

An aspect of this description is directed to a non-transitory computer-readable media having computer-readable instructions stored thereon [15], which when executed by a processor causes the processor to perform operations including monitoring sites in a mobile network for power outages, determining a power outage for a plurality of the sites in the mobile network qualifies as a crisis, converting the plurality of the sites in the mobile network that are in a higher configuration to a lower configuration, determining whether a cause for the power outage of the plurality of the sites has been addressed, and in response to the cause for the power outage of the plurality of the sites being addressed, converting the plurality of the sites in the mobile network that were converted to the lower configuration to the higher configuration.

The non-transitory computer-readable media described in [15], wherein the determining the power outage for the plurality of the sites in the mobile network qualifies as the crisis includes determining the power outage for the plurality of the sites in the mobile network satisfies a crisis criteria, obtaining data regarding the power outage for the plurality of the sites in the mobile network, based on the data, determining a count of the plurality of the sites experiencing the power outage is greater than a predetermined count threshold, based on the count of the plurality of the sites experiencing the power outage being greater than the predetermined count threshold, determining the plurality of the sites experiencing the power outage are associated with a same geography/administrative district, determining the power outage for the plurality of the sites in the mobile network does not satisfy the crisis criteria, determining the count of the plurality of the sites experiencing the power outage is not greater than the predetermined count threshold, or determining the plurality of the sites experiencing the power outage are not associated with the same geography/administrative district, and, in response, determining whether the plurality of the sites in the mobile network experience the power outage based on planned activity, and after determining whether the plurality of the sites in the mobile network experience the power outage based on planned activity, return to the monitoring the sites in the mobile network for power outages.

The non-transitory computer-readable media described in any one of [15] or [16], wherein the determining the power outage for the plurality of the sites in the mobile network qualifies as the crisis includes analyzing predetermined crisis parameters to determine whether the power outage for the plurality of the sites in the mobile network qualifies as the crisis, wherein the predetermined crisis parameters include one or more of the cause of the power outage to the plurality of the sites, a geography in which the power outage to the plurality of the sites occurs, a number of site experiencing the power outage, a number of people impacted by the power outage of the plurality of the sites, characterization of the geography of the plurality of the sites as a high density area or low density area, or a level of impact of the power outage of the plurality of the sites has on the mobile network.

The non-transitory computer-readable media described in any one of [15] to [17], wherein the converting the plurality of the sites in the mobile network that are in the higher configuration to the lower configuration includes checking a current configuration of the plurality of the sites in the mobile network experiencing the power outage, determining whether the sites experiencing the power outage are in the higher configuration or the lower configuration, in response to the sites experiencing the power outage being in the lower configuration, returning to monitor the sites in the mobile network for power outages, in response to the sites experiencing the power outage being in the higher configuration, triggering a conversion of the sites to the lower configuration, executing a change request to convert the sites experiencing the power outage and in the higher configuration to the lower configuration, and waiting for a predetermined delay time threshold for the sites experiencing the power outage and in the higher configuration to be converted to the lower configuration.

The non-transitory computer-readable media described in any one of [15] to [18], wherein the determining whether the cause for the power outage of the plurality of the sites has been addressed includes, after waiting for the predetermined delay time threshold for the sites experiencing the power outage and in the higher configuration to be converted to the lower configuration, determining whether an external alarm for the power outage of the plurality of the sites converted to the lower configuration has been cleared and whether the plurality of the sites converted to the lower configuration are able to operate in the higher configuration, in response to the external alarm for the power outage of the plurality of the sites converted to the lower configuration not being cleared and the plurality of the sites converted to the lower configuration not being able to operate in the higher configuration, continue to wait the predetermined delay time threshold, and in response to the external alarm for the power outage of the plurality of the sites converted to the lower configuration being cleared and the plurality of the sites converted to the lower configuration being able to operate in the higher configuration, checking the current configuration for the plurality of the sites.

The non-transitory computer-readable media described in any one of [15] to [19], wherein the converting the plurality of the sites in the mobile network that were converted to the lower configuration to the higher configuration includes triggering a conversion of the plurality of the sites in the mobile network in the lower configuration to the higher configuration, in response to the triggering the conversion of the plurality of the sites in the mobile network in the lower configuration to the higher configuration, generate a change request for converting the sites in the mobile network that were converted to the lower configuration to the higher configuration, in response to the change request being approved, executing the change request to convert the sites in the mobile network that were converted to the lower configuration to the higher configuration, waiting for a predetermined delay time threshold for the sites experiencing the power outage and in the lower configuration to be converted to the higher configuration, determining whether the conversion of the sites experiencing the power outage and in the lower configuration to the higher configuration was successful, in response to the conversion of the sites experiencing the power outage and in the lower configuration to the higher configuration not being successful, continue to wait for the predetermined delay time threshold or retriggering the executing of the change request to convert conversion of the sites experiencing the power outage and in the lower configuration to the higher configuration, and in response to the conversion of the sites experiencing the power outage and in the lower configuration to the higher configuration being successful, sending an activity report detailing information regarding the process for handling the crisis and returning to the monitoring the sites in the mobile network for power outages.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method, comprising:

monitoring sites in a mobile network for power outages;

determining a power outage for a plurality of the sites in the mobile network qualifies as a crisis;

converting the plurality of the sites in the mobile network that are in a higher Multiple-Input Multiple-Output (MIMO) configuration to a lower MIMO configuration, wherein the converting the plurality of the sites in the mobile network that are in the higher MIMO configuration to the lower MIMO configuration includes triggering a conversion of the sites to the lower MIMO configuration in response to the sites experiencing the power outage being in the higher MIMO configuration, and executing a change request to convert the sites experiencing the power outage and in the higher MIMO configuration to the lower MIMO configuration;

determining whether a cause for the power outage of the plurality of the sites has been addressed; and in response to the cause for the power outage of the plurality of the sites being addressed, converting the plurality of the sites in the mobile network that were converted to the lower MIMO configuration to the higher MIMO configuration.

2. The method of claim 1, wherein the determining the power outage for the plurality of the sites in the mobile network qualifies as the crisis comprises:

determining the power outage for the plurality of the sites in the mobile network satisfies a crisis criteria;

obtaining data regarding the power outage for the plurality of the sites in the mobile network;

based on the data, determining a count of the plurality of the sites experiencing the power outage is greater than a predetermined count threshold; and based on the count of the plurality of the sites experiencing the power outage being greater than the predetermined count threshold, determining the plurality of the sites experiencing the power outage are associated with a same geography/administrative district.

3. The method of claim 2 further comprising:

determining the power outage for the plurality of the sites in the mobile network does not satisfy the crisis criteria, determining the count of the plurality of the sites experiencing the power outage is not greater than the predetermined count threshold, or determining the plurality of the sites experiencing the power outage are not associated with the same geography/administrative district, and, in response, determining whether the plurality of the sites in the mobile network experience the power outage based on planned activity; and after determining whether the plurality of the sites in the mobile network experience the power outage based on the planned activity, return to the monitoring the sites in the mobile network for the power outages.

4. The method of claim 1, wherein the determining the power outage for the plurality of the sites in the mobile network qualifies as the crisis comprises:

analyzing predetermined crisis parameters to determine whether the power outage for the plurality of the sites in the mobile network qualifies as the crisis, wherein the predetermined crisis parameters include one or more of the cause of the power outage to the plurality of the sites, a geography in which the power outage to the plurality of the sites occurs, a number of site experiencing the power outage, a number of people impacted by the power outage of the plurality of the sites, characterization of the geography of the plurality of the sites as a high density area or low density area, or a level of impact of the power outage of the plurality of the sites has on the mobile network.

5. The method of claim 1, wherein the converting the plurality of the sites in the mobile network that are in the higher MIMO configuration to the lower MIMO configuration includes:

checking a current MIMO configuration of the plurality of the sites in the mobile network experiencing the power outage;

determining whether the sites experiencing the power outage are in the higher MIMO configuration or the lower MIMO configuration;

in response to the sites experiencing the power outage being in the lower MIMO configuration, returning to monitor the sites in the mobile network for the power outages; and waiting for a predetermined delay time threshold for the sites experiencing the power outage and in the higher MIMO configuration to be converted to the lower MIMO configuration.

6. The method of claim 5, wherein the determining whether the cause for the power outage of the plurality of the sites has been addressed includes:

after waiting for the predetermined delay time threshold for the sites experiencing the power outage and in the higher MIMO configuration to be converted to the lower MIMO configuration, determining whether an external alarm for the power outage of the plurality of the sites converted to the lower MIMO configuration has been cleared and whether the plurality of the sites converted to the lower MIMO configuration are able to operate in the higher MIMO configuration;

in response to the external alarm for the power outage of the plurality of the sites converted to the lower MIMO configuration not being cleared and the plurality of the sites converted to the lower MIMO configuration not being able to operate in the higher MIMO configuration, continue to wait the predetermined delay time threshold; and in response to the external alarm for the power outage of the plurality of the sites converted to the lower MIMO configuration being cleared and the plurality of the sites converted to the lower MIMO configuration being able to operate in the higher MIMO configuration, checking the current MIMO configuration for the plurality of the sites.

7. The method of claim 1, wherein the converting the plurality of the sites in the mobile network that were converted to the lower MIMO configuration to the higher MIMO configuration includes:

triggering a conversion of the plurality of the sites in the mobile network in the lower MIMO configuration to the higher MIMO configuration;

in response to the triggering the conversion of the plurality of the sites in the mobile network in the lower MIMO configuration to the higher MIMO configuration, generate the change request for converting the sites in the mobile network that were converted to the lower MIMO configuration to the higher MIMO configuration;

in response to the change request being approved, executing the change request to convert the sites in the mobile network that were converted to the lower MIMO configuration to the higher MIMO configuration;

waiting for a predetermined delay time threshold for the sites experiencing the power outage and in the lower MIMO configuration to be converted to the higher MIMO configuration;

determining whether the conversion of the sites experiencing the power outage and in the lower MIMO configuration to the higher MIMO configuration was successful;

in response to the conversion of the sites experiencing the power outage and in the lower MIMO configuration to the higher MIMO configuration not being successful, continue to wait for the predetermined delay time threshold or retriggering the executing of the change request to convert conversion of the sites experiencing the power outage and in the lower MIMO configuration to the higher MIMO configuration; and in response to the conversion of the sites experiencing the power outage and in the lower MIMO configuration to the higher MIMO configuration being successful, sending an activity report detailing information regarding handling the crisis and returning to the monitoring the sites in the mobile network for the power outages.

8. A device, configured to:

monitor sites in a mobile network for power outages;

determine a power outage for a plurality of the sites in the mobile network qualifies as a crisis;

convert the plurality of the sites in the mobile network that are in a higher Multiple-Input Multiple-Output (MIMO) configuration to a lower MIMO configuration, wherein the converting the plurality of the sites in the mobile network that are in the higher MIMO configuration to the lower MIMO configuration includes triggering a conversion of the sites to the lower MIMO configuration in response to the sites experiencing the power outage being in the higher MIMO configuration, and executing a change request to convert the sites experiencing the power outage and in the higher MIMO configuration to the lower MIMO configuration;

determine whether a cause for the power outage of the plurality of the sites has been addressed; and in response to the cause for the power outage of the plurality of the sites being addressed, convert the plurality of the sites in the mobile network that were converted to the lower MIMO configuration to the higher MIMO configuration.

9. The device of claim 8, further configured to determine the power outage for the plurality of the sites in the mobile network qualifies as the crisis by:

determining the power outage for the plurality of the sites in the mobile network satisfies a crisis criteria;

obtaining data regarding the power outage for the plurality of the sites in the mobile network;

based on the data, determining a count of the plurality of the sites experiencing the power outage is greater than a predetermined count threshold; and based on the count of the plurality of the sites experiencing the power outage being greater than the predetermined count threshold, determining the plurality of the sites experiencing the power outage are associated with a same geography/administrative district.

10. The device of claim 9, further configured to:

determine the power outage for the plurality of the sites in the mobile network does not satisfy the crisis criteria, determining the count of the plurality of the sites experiencing the power outage is not greater than the predetermined count threshold, or determining the plurality of the sites experiencing the power outage are not associated with the same geography/administrative district, and, in response, determining whether the plurality of the sites in the mobile network experience the power outage based on planned activity; and after determining whether the plurality of the sites in the mobile network experience the power outage based on the planned activity, return to the monitoring the sites in the mobile network for the power outages.

11. The device of claim 8, further configured to determine the power outage for the plurality of the sites in the mobile network qualifies as the crisis by:

analyzing predetermined crisis parameters to determine whether the power outage for the plurality of the sites in the mobile network qualifies as the crisis, wherein the predetermined crisis parameters include one or more of the cause of the power outage to the plurality of the sites, a geography in which the power outage to the plurality of the sites occurs, a number of site experiencing the power outage, a number of people impacted by the power outage of the plurality of the sites, characterization of the geography of the plurality of the sites as a high density area or low density area, or a level of impact of the power outage of the plurality of the sites has on the mobile network.

12. The device of claim 8, further configured to convert the plurality of the sites in the mobile network that are in the higher MIMO configuration to the lower MIMO configuration by:

checking a current configuration of the plurality of the sites in the mobile network experiencing the power outage;

determining whether the sites experiencing the power outage are in the higher MIMO configuration or the lower MIMO configuration;

in response to the sites experiencing the power outage being in the lower MIMO configuration, returning to monitor the sites in the mobile network for the power outages; and waiting for a predetermined delay time threshold for the sites experiencing the power outage and in the higher MIMO configuration to be converted to the lower MIMO configuration.

13. The device of claim 12, further configured to determine whether the cause for the power outage of the plurality of the sites has been addressed by:

after waiting for the predetermined delay time threshold for the sites experiencing the power outage and in the higher MIMO configuration to be converted to the lower MIMO configuration, determining whether an external alarm for the power outage of the plurality of the sites converted to the lower MIMO configuration has been cleared and whether the plurality of the sites converted to the lower MIMO configuration are able to operate in the higher MIMO configuration;

in response to the external alarm for the power outage of the plurality of the sites converted to the lower MIMO configuration not being cleared and the plurality of the sites converted to the lower MIMO configuration not being able to operate in the higher MIMO configuration, continue to wait the predetermined delay time threshold; and in response to the external alarm for the power outage of the plurality of the sites converted to the lower MIMO configuration being cleared and the plurality of the sites converted to the lower MIMO configuration being able to operate in the higher MIMO configuration, checking a current MIMO configuration for the plurality of the sites.

14. The device of claim 8, further configured to convert the plurality of the sites in the mobile network that were converted to the lower MIMO configuration to the higher MIMO configuration by:

triggering a conversion of the plurality of the sites in the mobile network in the lower MIMO configuration to the higher MIMO configuration;

in response to the triggering the conversion of the plurality of the sites in the mobile network in the lower MIMO configuration to the higher MIMO configuration, generate the change request for converting the sites in the mobile network that were converted to the lower MIMO configuration to the higher MIMO configuration;

in response to the change request being approved, executing the change request to convert the sites in the mobile network that were converted to the lower MIMO configuration to the higher MIMO configuration;

waiting for a predetermined delay time threshold for the sites experiencing the power outage and in the lower MIMO configuration to be converted to the higher MIMO configuration;

determining whether the conversion of the sites experiencing the power outage and in the lower MIMO configuration to the higher MIMO configuration was successful;

in response to the conversion of the sites experiencing the power outage and in the lower MIMO configuration to the higher MIMO configuration not being successful, continue to wait for the predetermined delay time threshold or retriggering the executing of the change request to convert conversion of the sites experiencing the power outage and in the lower MIMO configuration to the higher MIMO configuration; and in response to the conversion of the sites experiencing the power outage and in the lower MIMO configuration to the higher MIMO configuration being successful, sending an activity report detailing information regarding a process for handling the crisis and returning to the monitoring the sites in the mobile network for the power outages.

15. A non-transitory computer-readable media having computer-readable instructions stored thereon, which when executed by a processor causes the processor to perform operations comprising:

monitoring sites in a mobile network for power outages;

determining a power outage for a plurality of the sites in the mobile network qualifies as a crisis;

converting the plurality of the sites in the mobile network that are in a higher Multiple-Input Multiple-Output (MIMO) configuration to a lower MIMO configuration, wherein the converting the plurality of the sites in the mobile network that are in the higher MIMO configuration to the lower MIMO configuration includes triggering a conversion of the sites to the lower MIMO configuration in response to the sites experiencing the power outage being in the higher MIMO configuration, and executing a change request to convert the sites experiencing the power outage and in the higher MIMO configuration to the lower MIMO configuration;

determining whether a cause for the power outage of the plurality of the sites has been addressed; and in response to the cause for the power outage of the plurality of the sites being addressed, converting the plurality of the sites in the mobile network that were converted to the lower MIMO configuration to the higher MIMO configuration.

16. The non-transitory computer-readable media of claim 15, wherein the determining the power outage for the plurality of the sites in the mobile network qualifies as the crisis comprises:

determining the power outage for the plurality of the sites in the mobile network satisfies a crisis criteria;

obtaining data regarding the power outage for the plurality of the sites in the mobile network;

based on the data, determining a count of the plurality of the sites experiencing the power outage is greater than a predetermined count threshold;

based on the count of the plurality of the sites experiencing the power outage being greater than the predetermined count threshold, determining the plurality of the sites experiencing the power outage are associated with a same geography/administrative district;

determining the power outage for the plurality of the sites in the mobile network does not satisfy the crisis criteria, determining the count of the plurality of the sites experiencing the power outage is not greater than the predetermined count threshold, or determining the plurality of the sites experiencing the power outage are not associated with the same geography/administrative district, and, in response, determining whether the plurality of the sites in the mobile network experience the power outage based on planned activity; and after determining whether the plurality of the sites in the mobile network experience the power outage based on the planned activity, return to the monitoring the sites in the mobile network for the power outages.

17. The non-transitory computer-readable media of claim 15, wherein the determining the power outage for the plurality of the sites in the mobile network qualifies as the crisis comprises:

analyzing predetermined crisis parameters to determine whether the power outage for the plurality of the sites in the mobile network qualifies as the crisis, wherein the predetermined crisis parameters include one or more of the cause of the power outage to the plurality of the sites, a geography in which the power outage to the plurality of the sites occurs, a number of site experiencing the power outage, a number of people impacted by the power outage of the plurality of the sites, characterization of the geography of the plurality of the sites as a high density area or low density area, or a level of impact of the power outage of the plurality of the sites has on the mobile network.

18. The non-transitory computer-readable media of claim 15, wherein the converting the plurality of the sites in the mobile network that are in the higher MIMO configuration to the lower MIMO configuration includes:

checking a current configuration of the plurality of the sites in the mobile network experiencing the power outage;

determining whether the sites experiencing the power outage are in the higher MIMO configuration or the lower MIMO configuration;

in response to the sites experiencing the power outage being in the lower MIMO configuration, returning to monitor the sites in the mobile network for the power outages; and waiting for a predetermined delay time threshold for the sites experiencing the power outage and in the higher MIMO configuration to be converted to the lower MIMO configuration.

19. The non-transitory computer-readable media of claim 18, wherein the determining whether the cause for the power outage of the plurality of the sites has been addressed includes:

after waiting for the predetermined delay time threshold for the sites experiencing the power outage and in the higher MIMO configuration to be converted to the lower MIMO configuration, determining whether an external alarm for the power outage of the plurality of the sites converted to the lower MIMO configuration has been cleared and whether the plurality of the sites converted to the lower MIMO configuration are able to operate in the higher MIMO configuration;

in response to the external alarm for the power outage of the plurality of the sites converted to the lower MIMO configuration not being cleared and the plurality of the sites converted to the lower MIMO configuration not being able to operate in the higher MIMO configuration, continue to wait the predetermined delay time threshold; and in response to the external alarm for the power outage of the plurality of the sites converted to the lower MIMO configuration being cleared and the plurality of the sites converted to the lower MIMO configuration being able to operate in the higher MIMO configuration, checking a current MIMO configuration for the plurality of the sites.

20. The non-transitory computer-readable media of claim 15, wherein the converting the plurality of the sites in the mobile network that were converted to the lower MIMO configuration to the higher MIMO configuration includes:

triggering a conversion of the plurality of the sites in the mobile network in the lower MIMO configuration to the higher MIMO configuration;

in response to the triggering the conversion of the plurality of the sites in the mobile network in the lower MIMO configuration to the higher MIMO configuration, generate the change request for converting the sites in the mobile network that were converted to the lower MIMO configuration to the higher MIMO configuration;

in response to the change request being approved, executing the change request to convert the sites in the mobile network that were converted to the lower MIMO configuration to the higher MIMO configuration;

waiting for a predetermined delay time threshold for the sites experiencing the power outage and in the lower MIMO configuration to be converted to the higher MIMO configuration;

determining whether the conversion of the sites experiencing the power outage and in the lower MIMO configuration to the higher MIMO configuration was successful;

in response to the conversion of the sites experiencing the power outage and in the lower MIMO configuration to the higher MIMO configuration not being successful, continue to wait for the predetermined delay time threshold or retriggering the executing of the change request to convert conversion of the sites experiencing the power outage and in the lower MIMO configuration to the higher MIMO configuration; and in response to the conversion of the sites experiencing the power outage and in the lower MIMO configuration to the higher MIMO configuration being successful, sending an activity report detailing information regarding a process for handling the crisis and returning to the monitoring the sites in the mobile network for the power outages.

* * * * *